United States Patent
Xu et al.

(10) Patent No.: US 9,936,429 B2
(45) Date of Patent: *Apr. 3, 2018

(54) METHOD AND APPARATUS FOR SETTING UP SCTP CONNECTION AND X2 INTERFACE IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Kyungmin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/592,668

(22) Filed: May 11, 2017

(65) Prior Publication Data

US 2017/0251412 A1   Aug. 31, 2017

Related U.S. Application Data

(63) Continuation of application No. 14/412,164, filed as application No. PCT/KR2013/009897 on Nov. 4, 2013, now Pat. No. 9,674,893.

(Continued)

(51) Int. Cl.
*H04W 88/16* (2009.01)
*H04W 36/00* (2009.01)
(Continued)

(52) U.S. Cl.
CPC ... *H04W 36/0077* (2013.01); *H04W 36/0061* (2013.01); *H04W 84/045* (2013.01); *H04W 88/16* (2013.01); *H04W 92/20* (2013.01)

(58) Field of Classification Search
None
See application file for complete search history.

(56) References Cited

U.S. PATENT DOCUMENTS 9,357,454 B2 *  5/2016  Hansson ............ H04W 36/0088
9,674,893 B2 *  6/2017  Xu ..................... H04W 92/20
(Continued)

FOREIGN PATENT DOCUMENTS

EP              2448324 A1       5/2012
JP           2013-533694 A       8/2013
(Continued)

OTHER PUBLICATIONS

New Postcom, "Discussion on the relationship between S1-GW and X2-GW", 3GPP TSG RAN WG3 Meeting #77bis, R3-122169, Oct. 8-12, 2012, pp. 1-5.

(Continued)

*Primary Examiner* — Chi H Pham
*Assistant Examiner* — Shick Hom
(74) *Attorney, Agent, or Firm* — Birch, Stewart, Kolasch & Birch, LLP

(57) ABSTRACT

A method for processing, by a gateway, an X2 message in a wireless communication system, the method includes receiving, by the gateway, an X2 setup request message and first target information from a first eNodeB (eNB); transmitting, by the gateway, the received X2 setup request message to a second eNB based on the received first target information; receiving, by the gateway, an X2 setup response message and second target information from the second eNB; and transmitting, by the gateway, the received X2 setup response message to the first eNB based on the received second target information.

20 Claims, 21 Drawing Sheets

Related U.S. Application Data

(60) Provisional application No. 61/753,856, filed on Jan. 17, 2013, provisional application No. 61/721,512, filed on Nov. 2, 2012.

(51) Int. Cl.
*H04W 92/20* (2009.01)
*H04W 84/04* (2009.01)

(56) References Cited

U.S. PATENT DOCUMENTS

| | | | |
|---|---|---|---|
| 2011/0237258 A1* | 9/2011 | Nylander | H04J 11/0093 455/437 |
| 2011/0274030 A1 | 11/2011 | Wang et al. | |
| 2011/0310791 A1 | 12/2011 | Prakash et al. | |
| 2012/0264418 A1 | 10/2012 | Lee et al. | |
| 2012/0270553 A1* | 10/2012 | Ha | H04W 36/22 455/438 |
| 2012/0309384 A1 | 12/2012 | Faerber et al. | |
| 2013/0012249 A1 | 1/2013 | Centonza et al. | |
| 2013/0150021 A1* | 6/2013 | Oh | H04W 88/16 455/422.1 |

FOREIGN PATENT DOCUMENTS

| | | |
|---|---|---|
| KR | 10-2012-0117225 A | 10/2012 |
| WO | WO 2011/163403 A2 | 12/2011 |
| WO | WO 2012/148217 A2 | 11/2012 |

OTHER PUBLICATIONS

Nokia Siemens Networks, "X2 setup between eNB and HeNB", 3GPP TSG RAN WG3 #78 meeting, R3-122501, Nov. 12-16, 2012, 3 pages.

ZTE, "Discussion on the X2 setup between eNB and HeNB", 3GPP TSG-RAN3 Meeting #78, Nov. 12-16, 2012, R3-122594, pp. 1-6.

* cited by examiner

FIG. 3
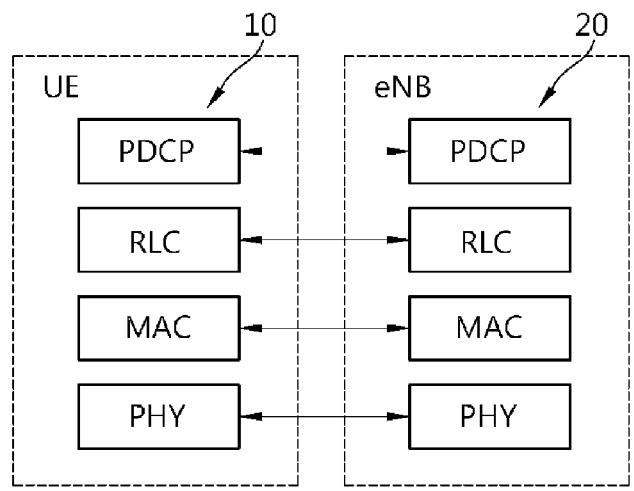
(a)
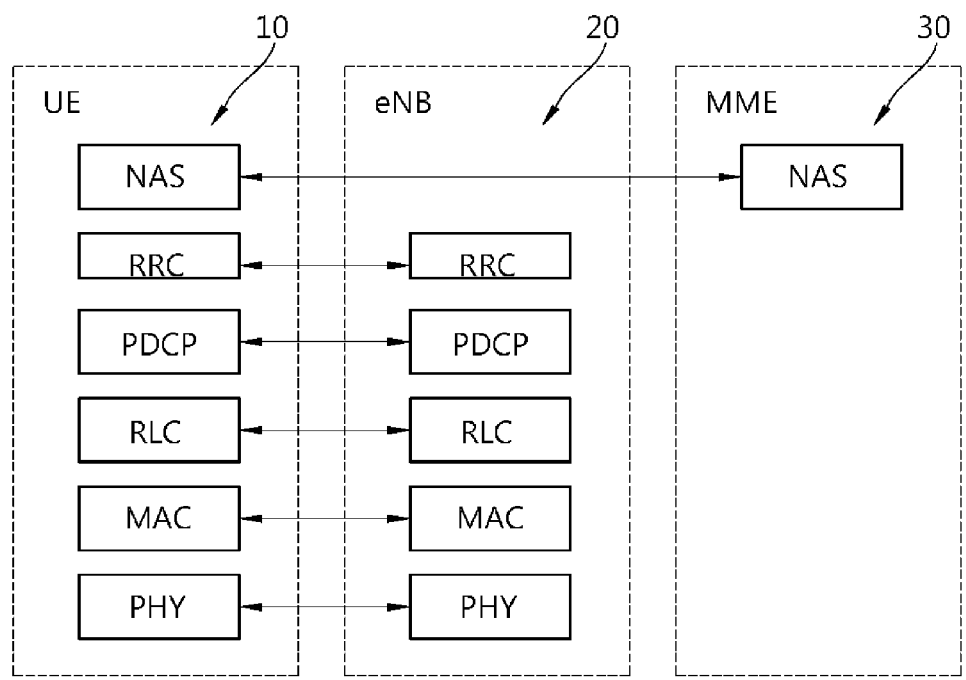
(b)

METHOD AND APPARATUS FOR SETTING UP SCTP CONNECTION AND X2 INTERFACE IN WIRELESS COMMUNICATION SYSTEM

CROSS-REFERENCE TO RELATED APPLICATIONS

This Application is a Continuation of U.S. patent application Ser. No. 14/412,164 filed on Dec. 30, 2014 (now U.S. Pat. No. 9,674,893 issued on Jun. 6, 2017), which is the National Phase of PCT/KR2013/009897 filed on Nov. 4, 2013, which claims the benefit under 35 U.S.C § 119(e) to U.S. Provisional Application Nos. 61/753,856 filed on Jan. 17, 2013 and 61/721,512 filed on Nov. 2, 2012, all of which are hereby expressly incorporated by reference into the present application,

BACKGROUND OF THE INVENTION

Field of the Invention

The present invention relates to wireless communications, and more particularly, to a method and apparatus for setting up a stream control transmission protocol (SCTP) connection and X2 interface in a wireless communication system.

Discussion of the Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over Internet protocol (VoIP) through IMS and packet data.

As shown in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways (S-GW) 30 may be positioned at the end of the network and connected to an external network.

As used herein, "downlink" refers to communication from the eNB 20 to the UE 10, and "uplink" refers to communication from the UE 10 to the eNB 20. The UE 10 refers to communication equipment carried by a user and may be also referred to as a mobile station (MS), a user terminal (UT), a subscriber station (SS) or a wireless device.

The eNB 20 provides end points of a user plane and a control plane to the UE 10. The MME/S-GW 30 provides an end point of a session and mobility management function for the UE 10. The eNB and MME/S-GW may be connected via an S1 interface.

The eNB 20 is generally a fixed station that communicates with the UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to the eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE IP address allocation, transport level packet marking in the downlink, UL and DL service level charging, gating and rate enforcement, DL rate enforcement based on APN-AMBR. For clarity, the MME/S-GW 30 will be referred to herein simply as a "gateway," but it is understood that this entity includes both the MME and the SAE gateway.

A plurality of nodes may be connected between the eNB 20 and the gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As shown, the eNB 20 may perform functions of selection for the gateway 30, routing toward the gateway during a radio resource control (RRC) activation, scheduling and transmitting of paging messages, scheduling and transmitting of broadcast channel (BCH) information, dynamic allocation of resources to the UEs 10 in both uplink and downlink, configuration and provisioning of eNB measurements, radio bearer control, radio admission control (RAC), and connection mobility control in LTE_ACTIVE state. In the EPC, and as noted above, the gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for an E-UMTS.

FIG. 3(a) is block diagram depicting the user-plane protocol, and FIG. 3(b) is block diagram depicting the control-plane protocol. As shown, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel.

Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer shown in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As shown in FIG. 3(a), the RLC and MAC layers (terminated in the eNB 20 on the network side) may perform functions such as scheduling, automatic repeat request (ARQ), and hybrid automatic repeat request (HARQ). The PDCP layer (terminated in the eNB 20 on the network side) may perform the user plane functions such as header compression, integrity protection, and ciphering.

As shown in FIG. 3(b), the RLC and MAC layers (terminated in the eNodeB 20 on the network side) perform the same functions for the control plane. As shown, the RRC layer (terminated in the eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE the 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from the UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows a structure of a physical channel.

The physical channel transfers signaling and data between layer L1 of the UE and eNB. As shown in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as physical resource blocks (PRBs) and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging the UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of the UE. The CCCH is used by UEs having no RRC connection with the network. The MCCH is a point-to-multipoint downlink channel used for transmitting MBMS control information from the network to the UE. The DCCH is a point-to-point bi-directional channel used by UEs having an RRC connection that transmits dedicated control information between the UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to the UL-SCH, a DTCH that can be mapped to the UL-SCH and a CCCH that can be mapped to the UL-SCH. Downlink connections between logical channels and transport channels include a BCCH that can be mapped to the BCH or the DL-SCH, a PCCH that can be mapped to the PCH, a DCCH that can be mapped to the DL-SCH, and a DTCH that can be mapped to the DL-SCH, a MCCH that can be mapped to the MCH, and a MTCH that can be mapped to the MCH.

A home eNB (HeNB) is described. It may be referred to Section 4.6 of 3GPP TS 36.300 V10.5.0 (2011-09).

The E-UTRAN architecture may deploy a HeNB gateway (HeNB GW) to allow the S1 interface between the HeNB and the EPC to support a large number of HeNBs in a scalable manner. The HeNB GW serves as a concentrator for the control plane (C-Plane), specifically the S1-MME interface. The S1-U interface from the HeNB may be terminated at the HeNB GW, or a direct logical user plane (U-Plane) connection between the HeNB and the S-GW may be used.

The S1 interface is defined as the interface:
Between the HeNB GW and the core network,
Between the HeNB and the HeNB GW,
Between the HeNB and the core network,
Between the eNB and the core network.

The HeNB GW appears to the MME as an eNB. The HeNB GW appears to the HeNB as an MME. The S1 interface between the HeNB and the EPC is the same, regardless whether the HeNB is connected to the EPC via the HeNB GW or not.

The HeNB GW shall connect to the EPC in a way that inbound and outbound mobility to cells served by the HeNB GW shall not necessarily require inter MME handovers. One HeNB serves only one cell.

The functions supported by the HeNB shall be the same as those supported by the eNB (with possible exceptions, e.g., NAS node selection function (NNSF)) and the procedures run between the HeNB and the EPC shall be the same as those between the eNB and the EPC (with possible exceptions, e.g., S5 procedures in case of local IP access (LIPA) support).

FIG. 5 shows overall E-UTRAN architecture with deployed HeNB GW.

Referring to FIG. 5, the E-UTRAN includes eNBs 50, HeNBs 60 and HeNB GW 69. One or more E-UTRAN MME/S-GW 59 may be positioned at the end of the network and connected to an external network. The eNBs 50 are connected to each other through the X2 interface. The eNBs 50 are connected to the MME/S-GW 59 through the S1 interface. The HeNB GW 69 is connected to the MME/S-GW 59 through the S1 interface. The HeNBs 60 are connected to the HeNB GW 69 through the S1 interface or are connected to the MME/S-GW 59 through the S1 interface or S5 interface.

Referring to FIG. 5, the HeNBs 60 are connected to each other through the X2 interface. Only the HeNBs with the same closed subscriber group (CSG) identifiers (IDs) may have the direct X2 interface even if some HeNBs may support a hybrid mode. If specific conditions are satisfied, handover may be done through direct X2 interface. That is, X2-based handover between HeNBs may be allowed if no access control at the MME is needed, i.e., when the handover is between closed/hybrid access HeNBs having the same CSG IDs or when the target HeNB is an open access HeNB.

Moreover, the X2 interface between a HeNB and macro eNB have been discussed for X2 handover between the HeNB and macro eNB. A direct X2 interface or an indirect X2 interface between the HeNB and macro eNB may be set up.

A transport network layer (TNL) address discovery is described. If the eNB is aware of the eNB ID of the candidate eNB (e.g., via the automatic neighbor relation (ANR) function) but not a TNL address suitable for stream control transmission protocol (SCTP) connectivity, then the eNB can utilize the configuration transfer function to determine the TNL address as follows:

The eNB sends the eNB configuration transfer message to the MME to request the TNL address of the candidate eNB, and includes relevant information such as the source and target eNB ID.

The MME relays the request by sending the MME configuration transfer message to the candidate eNB identified by the target eNB ID.

The candidate eNB responds by sending the eNB configuration transfer message containing one or more TNL addresses to be used for SCTP connectivity with the initiating eNB, and includes other relevant information such as the source and target eNB ID.

The MME relays the response by sending the MME configuration transfer message to the initiating eNB identified by the target eNB ID.

How to set up a stream control transmission protocol (SCTP) connection and X2 interface may be a problem.

SUMMARY OF THE INVENTION

The present invention provides a method for setting up a stream control transmission protocol (SCTP) connection and X2 interface in a wireless communication system. The present invention provides a method for transmitting target cell information in a wireless communication system. The present invention provides an X2 setup procedure for home eNodeB (HeNB) mobility enhancement.

In an aspect, a method for transmitting, by a first eNodeB (eNB), target cell information in a wireless communication system is provided. The method includes transmitting an X2 setup request message including target cell information to an X2-gateway (GW), and receiving an X2 setup response message including information on a second eNB as neighbor information from the X2-GW.

The target cell information may include at least one of target eNB identifier (ID), target cell ID or target radio network layer (RNL) ID.

The method may further include obtaining a transport network layer (TNL) address of the X2-GW. The method may further include initiating stream control transmission protocol (SCTP) connection setup towards the X2-GW using the obtained TNL address of the X2-GW.

The first eNB may be a macro eNB, and the second eNB may be a home eNB (HeNB).

The first eNB may be a HeNB, and the second eNB may be a macro eNB.

In another aspect, a method for transmitting, by an X2-gateway (GW), a message in a wireless communication system is provided. The method includes receiving an X2 setup request message including target cell information from a first eNodeB (eNB), and transmitting an X2 setup response message including information on a second eNB as neighbor information to the first eNB.

The method may further include transmitting an eNB configuration update message including information on the first eNB as neighbor information to the second eNB, if an X2 interface between the X2-GW and the second eNB has been already set up.

The method may further include transmitting an X2 setup request message including information on the first eNB as neighbor information to the second eNB, if an X2 interface between the X2-GW and the second eNB has not been already set up. The method may further include receiving an X2 setup response message including target cell information from the second eNB.

In another aspect, a method for transmitting, by a first eNodeB (eNB), target cell information in a wireless communication system is provided. The method includes transmitting a first eNB configuration update message including target cell information to an X2-gateway (GW), and receiving a second eNB configuration update message including information on a second eNB as neighbor information from the X2-GW.

An X2 setup problem for HeNB mobility enhancement, which is caused by the existing of X2-gateway (GW), can be solved.

BRIEF DESCRIPTION OF THE DRAWINGS

FIG. 3 shows a user-plane protocol and a control-plane protocol stack for an E-UMTS.

DETAILED DESCRIPTION OF THE EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
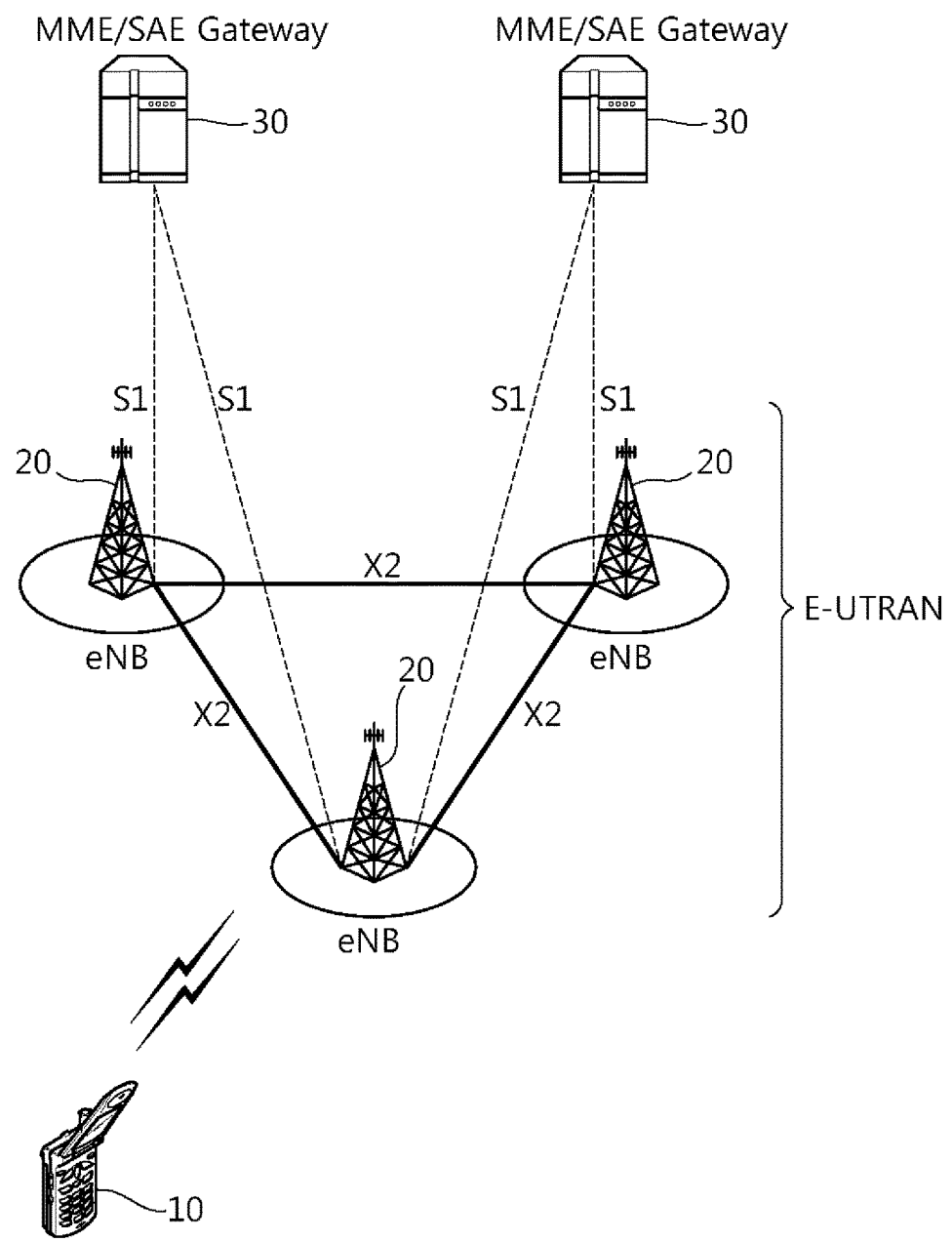
FIG. 1 shows network structure of an evolved universal mobile telecommunication system (E-UMTS).
Figure 2:
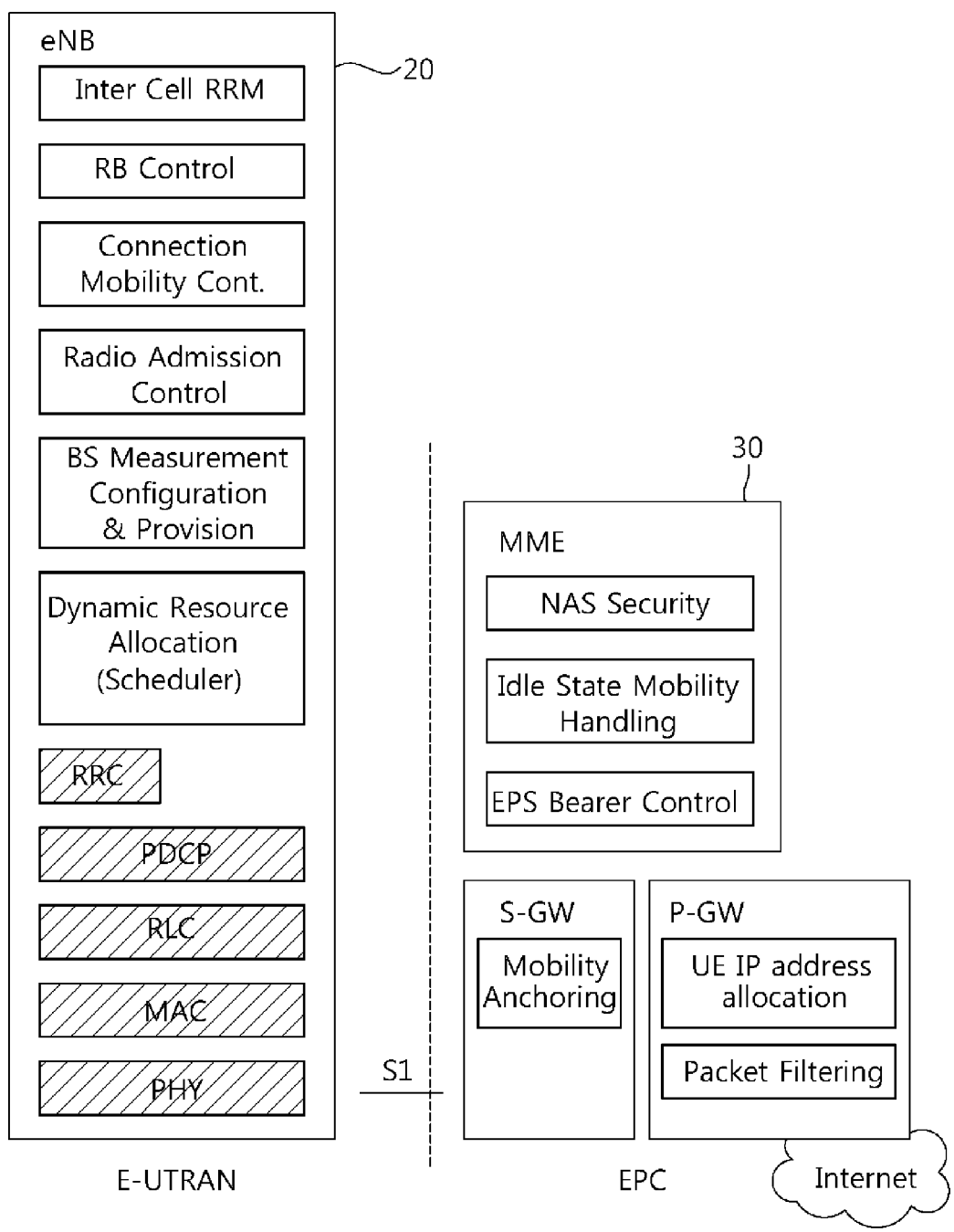
FIG. 2 shows architecture of a typical E-UTRAN and a typical EPC.
Figure 4:
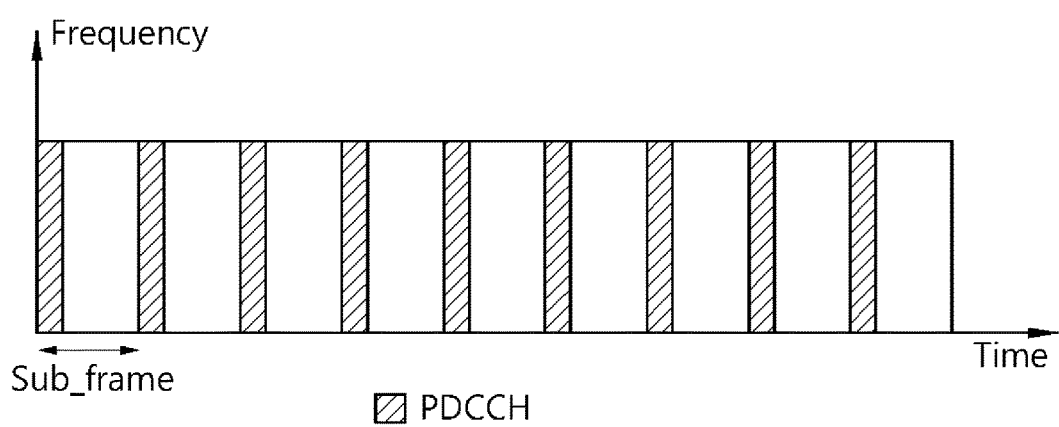
FIG. 4 shows a structure of a physical channel.
Figure 5:
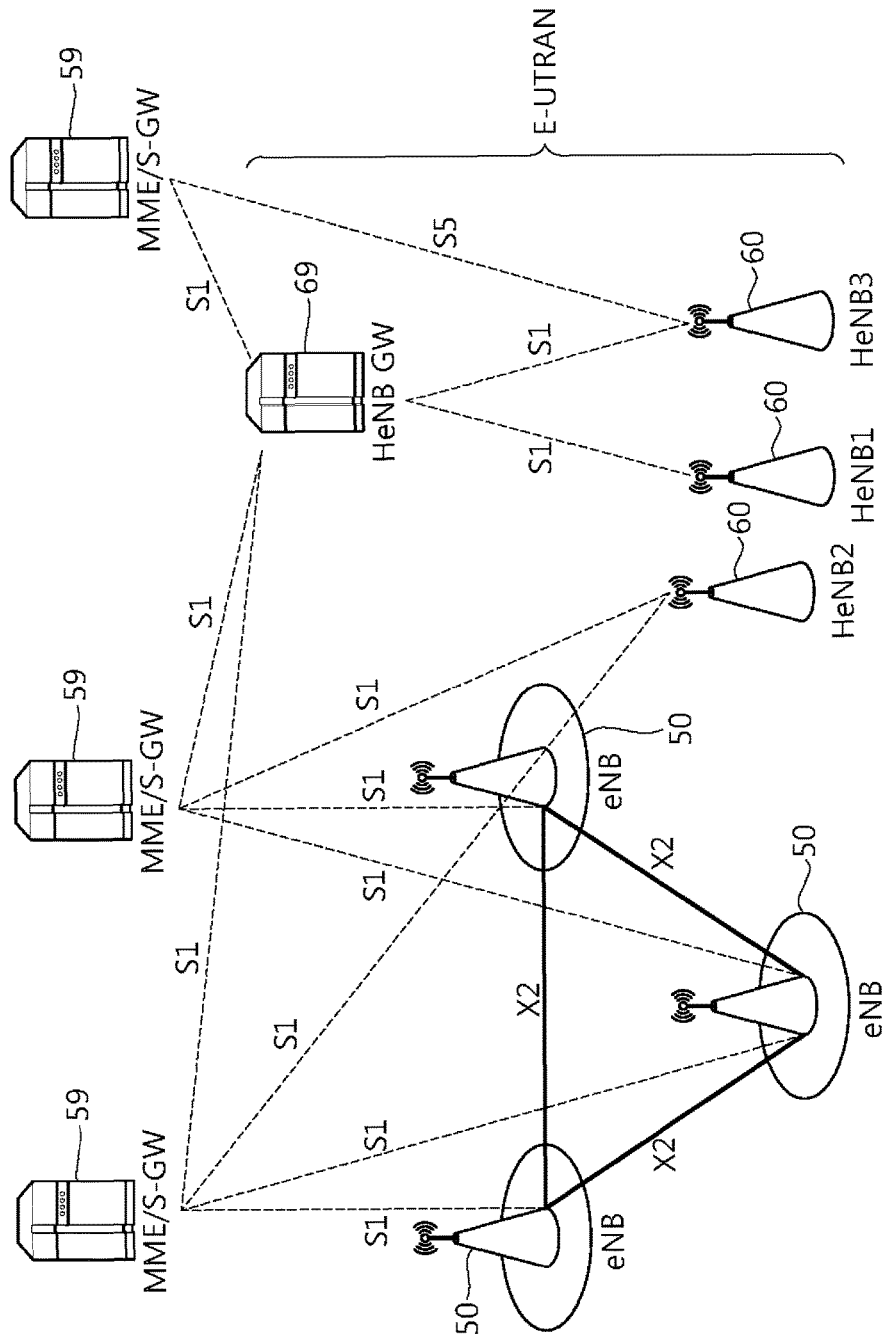
FIG. 5 shows overall E-UTRAN architecture with deployed HeNB GW.
Figure 6:
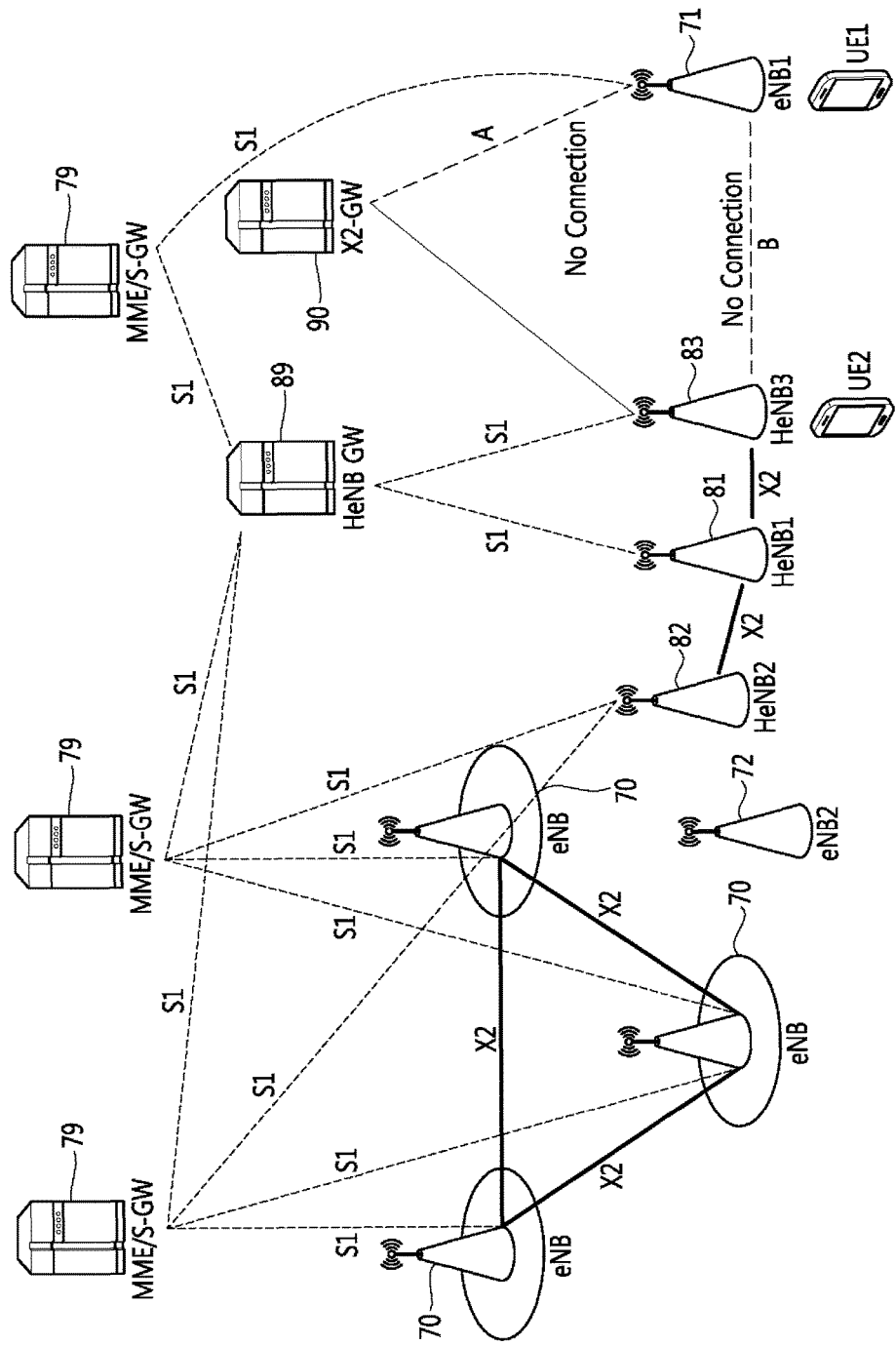
FIG. 6 shows an example of an X2 interface setup between a macro eNB and HeNB.

FIG. 6 shows an example of an X2 interface setup between a macro eNB and HeNB.

Referring to FIG. 6, the E-UTRAN includes macro eNBs 70, 71, 72, HeNBs 80, 81, 82, 83, HeNB GW 89, and X2-GW 90. One or more E-UTRAN MME/S-GW 79 may be positioned at the end of the network and connected to an external network. The macro eNBs 70 are connected to each other through the X2 interface. The macro eNBs 70, 71 are connected to the MME/S-GW 79 through the S1 interface. The HeNB GW 89 is connected to the MME/S-GW 79 through the S1 interface. The HeNB 81, 83 are connected to the HeNB GW 89 through the S1 interface. The HeNB 82 is connected to the MME/S-GW 79 through the S1 interface. The HeNBs 81, 82, 83 are connected to each other through the X2 interface.

The X2-GW 90 is additionally deployed. The X2-GW 90 is connected to the HeNB1 81 through the X2 interface. However, connection between the X2-GW 90 and HeNB3 83 is not established, yet. In addition, connection between the macro eNB1 71 and X2-GW 90 or connection between the macro eNB1 71 and HeNB3 83 is not established, yet.

The X2 interface may be introduced between the macro eNB and HeNB. There may exist two possible connections, one of which is to connect the HeNB and macro eNB indirectly by going through the X2-GW (path "A" in FIG. 6). The other way is to connect the HeNB and macro eNB directly by the X2 interface (path "B" in FIG. 6). Based on the structure described above in FIG. 6, X2 handover may be performed more quickly between the HeNB and macro eNB. For path "a" in FIG. 6, the X2-GW and HeNB GW may be separate nodes.

In FIG. 6, the X2 interface is not yet set between the macro eNB1 the HeNB3, which means whether the direct X2 interface or the indirect X2 interface going through the X2-GW has not been set up. Meanwhile, a transport network layer (TNL) address of the X2-GW may be pre-configured to the HeNB3 or macro eNB1. By applying a modified TNL address discovery procedure, the macro eNB1/HeNB3 may get the TNL address (or, IP address) of the X2-GW or peer node. However, how to set up a stream control transmission protocol (SCTP) connection and X2 interface with obtained IP address needs to be defined.

Hereinafter, a method for transmitting information on a target node according to embodiments of the present invention is described. The embodiments of the present invention include two scenarios on how to setup SCTP connection and X2 interface based on which peer node (macro eNB or HeNB) first discovers the other node.

Figure 7:
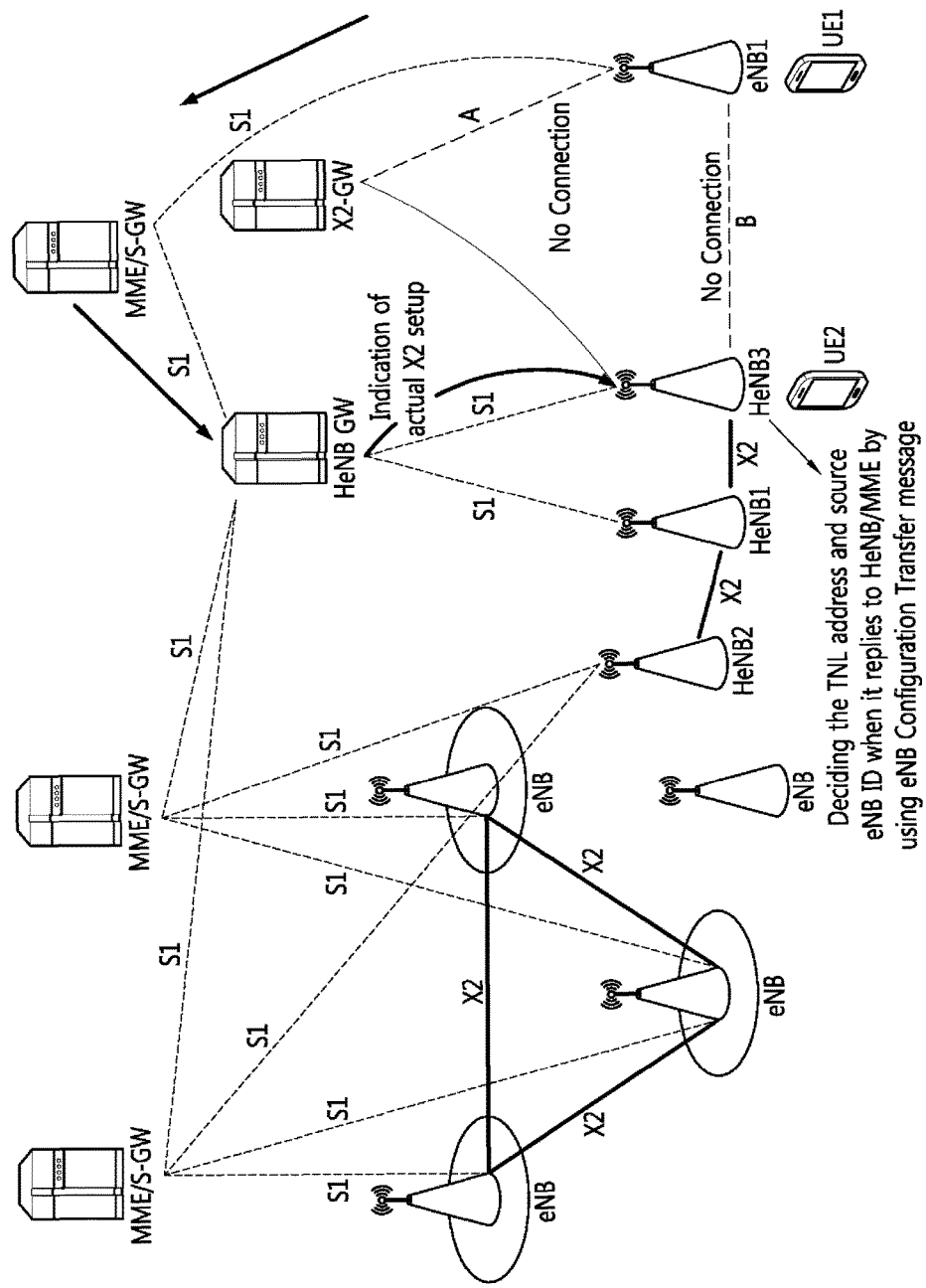
FIG. 7 shows a first scenario in which an embodiment of the present invention can be applied.

FIG. 7 shows a first scenario in which an embodiment of the present invention can be applied. In the first scenario, UE1 at a macro eNB1 cell discovers the HeNB3 and reports it to the macro eNB1. The macro eNB1 initiates the TNL address discovery procedure towards the HeNB3.

When the macro eNB1 initiates the TNL address discovery procedure towards the HeNB3 which supports CSG (open mode, hybrid mode or closed mode), the macro eNB1 may include an indication of the actual X2 setup between the macro eNB1 and HeNB3 or between the macro eNB1 and the corresponding X2-GW in an eNB configuration transfer message to the corresponding MME. That is, the indication of actual X2 setup indicates which X2 interface, i.e., direct or indirect, would be set up. The macro eNB1 transmits the eNB configuration transfer message including the indication of the actual X2 setup to the MME. The MME may forward the indication of actual X2 setup through an MME configuration transfer message to the corresponding HeNB GW. The HeNB GW may forward the indication of actual X2 setup through the MME configuration transfer message to the corresponding HeNB.

Upon receiving the indication of actual X2 setup, the HeNB3 decides a TNL address and source eNB identifier (ID). The TNL address may be either one of a TNL address of the HeNB3 or a TNL address of the X2-GW according to the actual X2 setup. The source eNB ID may also be either one of an eNB ID of the HeNB3 or an eNB ID of the X2-GW according to the actual X2 setup. More specifically, if the indication of actual X2 setup indicates X2 interface setup between the X2-GW and macro eNB1, i.e., the indirect X2 interface, the HeNB3 uses the TNL address of the X2-GW and the source eNB ID may be the eNB ID of the HeNB3 or the eNB ID of the X2-GW. If the indication indicates X2 interface setup between the HeNB3 and macro eNB1, i.e., the direct X2 interface, the HeNB3 uses the TNL address of the HeNB3 and the eNB ID of the HeNB3. The HeNB3 may reply to the HeNB GW/MME using the eNB configuration transfer message including the TNL address and the source eNB ID. After receiving the TNL address from the HeNB3, the macro eNB1 may initiate the X2 interface setup.

Figure 8:
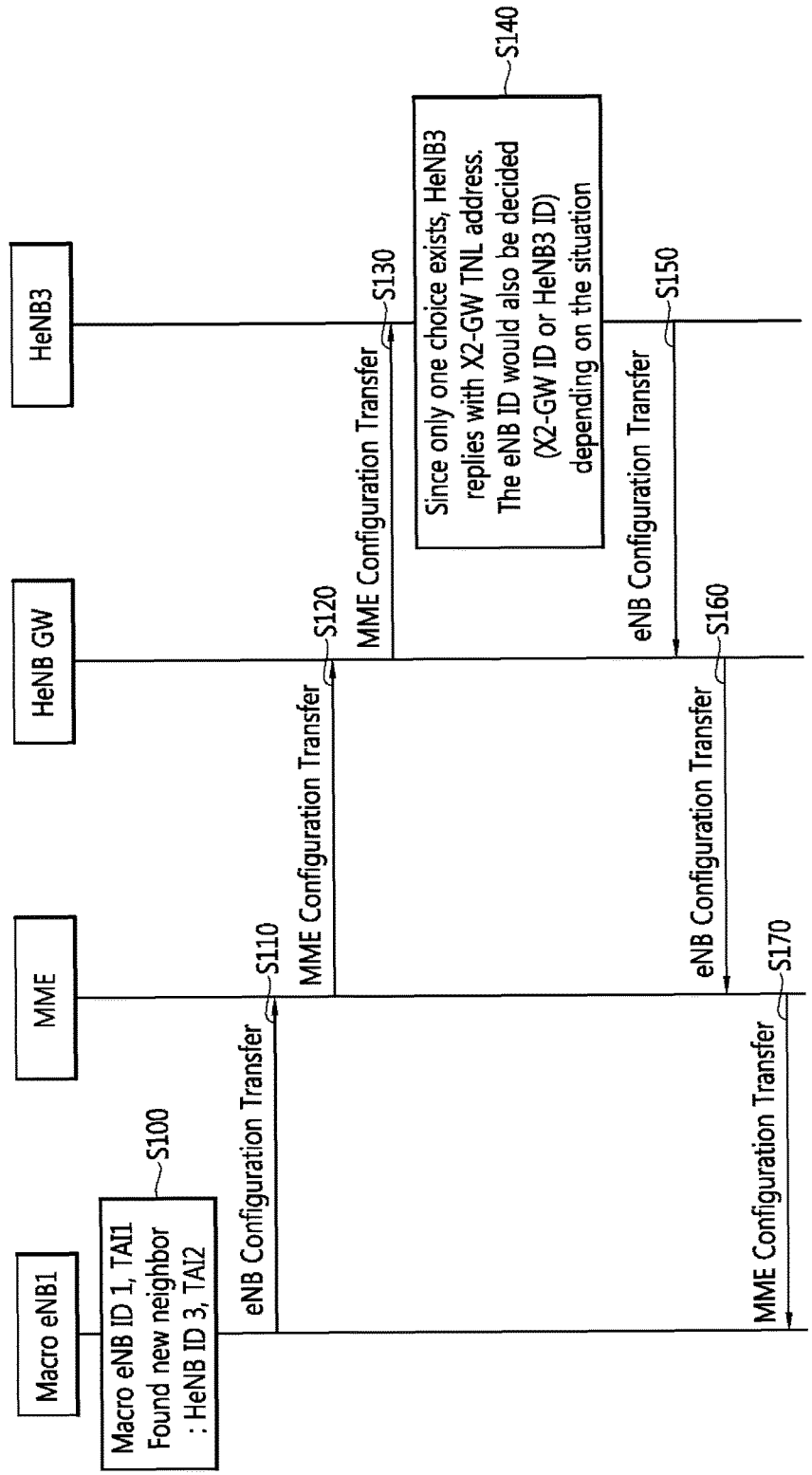
FIG. 8 shows an example of a TNL address discovery procedure for a first scenario.

FIG. 8 shows an example of a TNL address discovery procedure for a first scenario. This TNL address discovery procedure corresponds to a scenario in which only the indirect X2 interface going through the X2-GW is possible.

At step S100, the macro eNB1 finds new neighbor HeNB3. It is assumed that an ID of the macro eNB1 is 1, and a TAI of the macro eNB1 is 1. It is also assumed that an ID of the HeNB3 is 3, and a TAI of the HeNB3 is 2.

At step S110, the macro eNB1 transmits an eNB configuration transfer message to the MME. The eNB configuration transfer message includes the eNB ID of the macro eNB1/HeNB3, the TAI of the macro eNB1/HeNB3, and a SON information request. The eNB configuration transfer message may also include an indication of actual X2 setup. The indication of actual X2 setup indicates that the indirect X2 interface between the macro eNB1 and X2-GW would be set up.

At step S120, the MME transmits an MME configuration transfer message to the HeNB GW. At step S130, the HeNB GW transmits the MME configuration transfer message to the HeNB GW. The MME configuration transfer message includes the eNB ID of the macro eNB1/HeNB3, the TAI of the macro eNB1/HeNB3, and SON information request. The MME configuration transfer message may also include the indication of actual X2 setup.

At step S140, in this case, since only the indirect X2 interface would be setup, the HeNB3 does not need to determine a TNL address and source eNB ID. The HeNB3 uses the TNL address of the X2-GW and the source eNB ID may be the eNB ID of the HeNB3 or the eNB ID of the X2-GW.

At step S150, the HeNB3 transmits the eNB configuration transfer message to the HeNB GW. The eNB configuration transfer message includes the TNL address and the source eNB ID determined by the HeNB3.

At step S160, the HeNB forwards the TNL address and the source eNB ID to the MME by transmitting the eNB configuration transfer message to the MME. At step S170, the MME forwards the TNL address and the source eNB ID to the macro eNB1 by transmitting the MME configuration transfer message to the macro eNB1.

Figure 9:
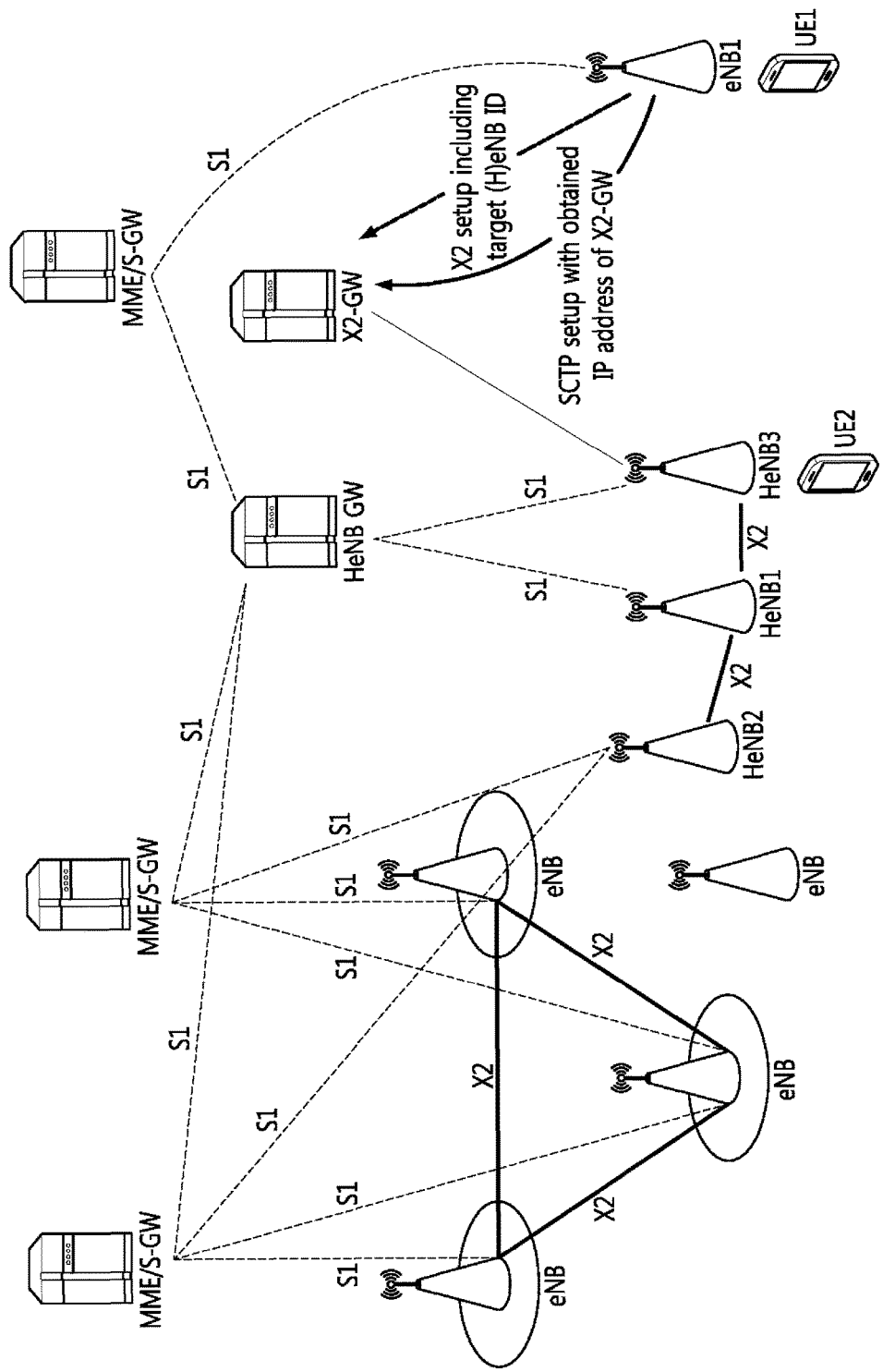
FIG. 9 shows an example of a method for setting up SCTP connection and X2 interface for a first scenario according to an embodiment of the present invention.

FIG. 9 shows an example of a method for setting up SCTP connection and X2 interface for a first scenario according to an embodiment of the present invention. In the example described in FIG. 9, it is assumed that the SCTP connection and X2 interface between the macro eNB1 and X2-GW has not been set up yet.

Referring to FIG. 9, after the macro eNB1 obtains the TNL address of the X2-GW, e.g., by the example described in FIG. 8, the macro eNB1 may initiate the SCTP association setup towards the X2-GW by using the obtained TNL address. The macro eNB1 may also initiate X2 interface setup towards the X2-GW with additional indication of a target node, e.g., the target (H)eNB ID or target cell ID. Or, the additional indication of the target node may be a target radio network layer (RNL) ID. The macro eNB1 may initiates the SCTP association setup and X2 interface setup by transmitting an X2 setup request message to the X2-GW.

Table 1 shows an example of the X2 setup request message according to the embodiment of the present invention.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 .. <maxCellineNB> | | Complete list of cells served by the eNB | YES | reject |
| >Served Cell Information | M | | 9.2.8 | | — | — |
| >Neighbour Information | | 0 .. <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0..503, . . . ) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| GU Group Id List | | 0 .. <maxfPools> | | This is all the pools to which the eNB belongs to | GLOBAL | reject |
| >GU Group Id Target cell information | M | | 9.2.20 | | — | — |

Referring to Table 1, the X2 setup request message includes the target cell information as well as served cell information.

When the X2-GW receives the X2 setup request message, including the initiation of the SCTP association setup and X2 interface setup, from the macro eNB1, the X2-GW may identify a target node through the additional indication of target node, e.g., the target (H)eNB ID, target cell ID, or target RNL ID, received from the macro eNB1.

If the X2 interface is already setup between the X2-GW and HeNB3, the X2-GW may transmit an X2 setup response message to the macro eNB1 with information on the HeNB3 as neighbor information, and at the same time, the X2-GW may transmit an eNB configuration update message to the HeNB3 information on the macro eNB1 as neighbor information. This case will be described in detail in FIG. 10 below.

If the X2 interface has not yet setup between the X2-GW and HeNB3, the X2-GW may transmit an X2 setup request message to the HeNB3 with information on the macro eNB1 as neighbor information. The target (H)eNB, i.e., HeNB3, may transmit an X2 setup response message to the X2-GW. The X2 setup response message may also include the target (H)eNB ID or target cell ID. The X2-Gw may identify the target cell with the the target (H)eNB ID or target cell ID included in the X2 setup response message, or may identify the target cell through the memorized macro cell ID. This case will be described in detail in FIG. 11 below.

Figure 10:
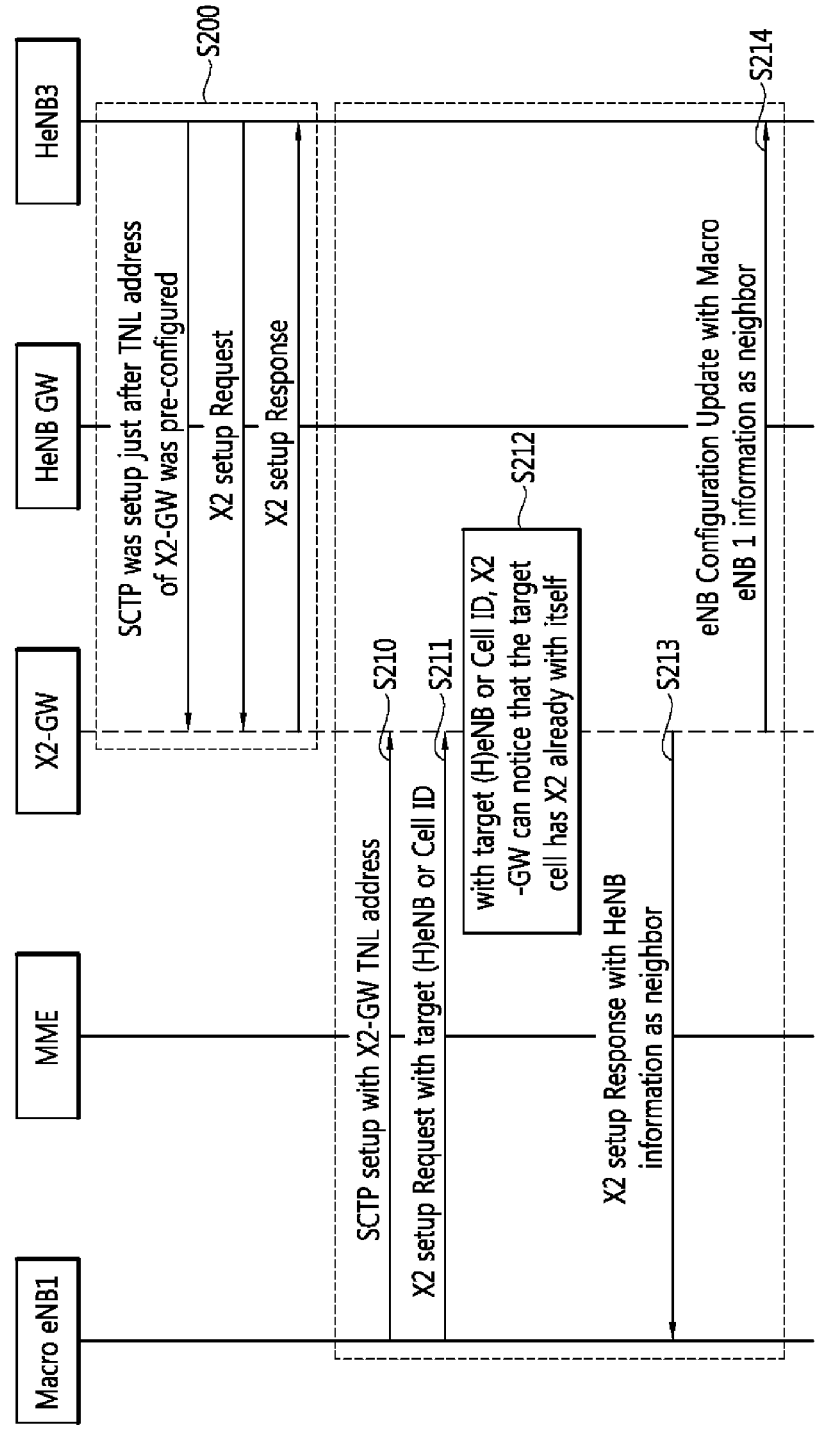
FIG. 10 shows an example of a SCTP connection and X2 interface setup procedure for a first scenario according to an embodiment of the present invention.

FIG. 10 shows an example of a SCTP connection and X2 interface setup procedure for a first scenario according to an embodiment of the present invention. In the example described in FIG. 10, it is assumed that the SCTP connection and X2 interface between the macro eNB1 and X2-GW has not been set up yet, and the SCTP connection and X2 interface setup between the HeNB3 and X2-GW is completed. The SCTP connection and X2 interface setup procedure described in FIG. 10 may be performed after the macro eNB1 obtains the TNL address of the X2-GW, e.g., by the example described in FIG. 8, At step S200, SCTP connection is set up just after the TNL address of the X2-GW is pre-configured to the HeNB3. The HeNB3 transmits an X2 setup request message to the X2-GW, and the X2-GW transmits an X2 setup response message to the HeNB3 as a response to the X2 setup request message.

At step S210, the macro eNB1 initiates SCTP connection setup using the obtained TNL address of the X2-GW. Also, at step S211, the macro eNB1 initiates X2 interface setup by transmitting an X2 setup request message. The X2 setup request message may include information on a target node, e.g., the target (H)eNB ID, target cell ID, or target RNL ID. The X2 setup request message described above in Table 1 may be used.

At step 212, upon receiving the information on the target node, the X2-GW may notice that the X2 interface between the X2-GW and target (H)eNB has already been set up. Accordingly, at step S213, the X2-GW transmits an X2 setup response message with information on the HeNB3 as neighbor information to the macro eNB1. At step S24, the X2-GW transmits an eNB configuration update message with information on the macro eNB1 as neighbor information to the HeNB3.

Figure 11:
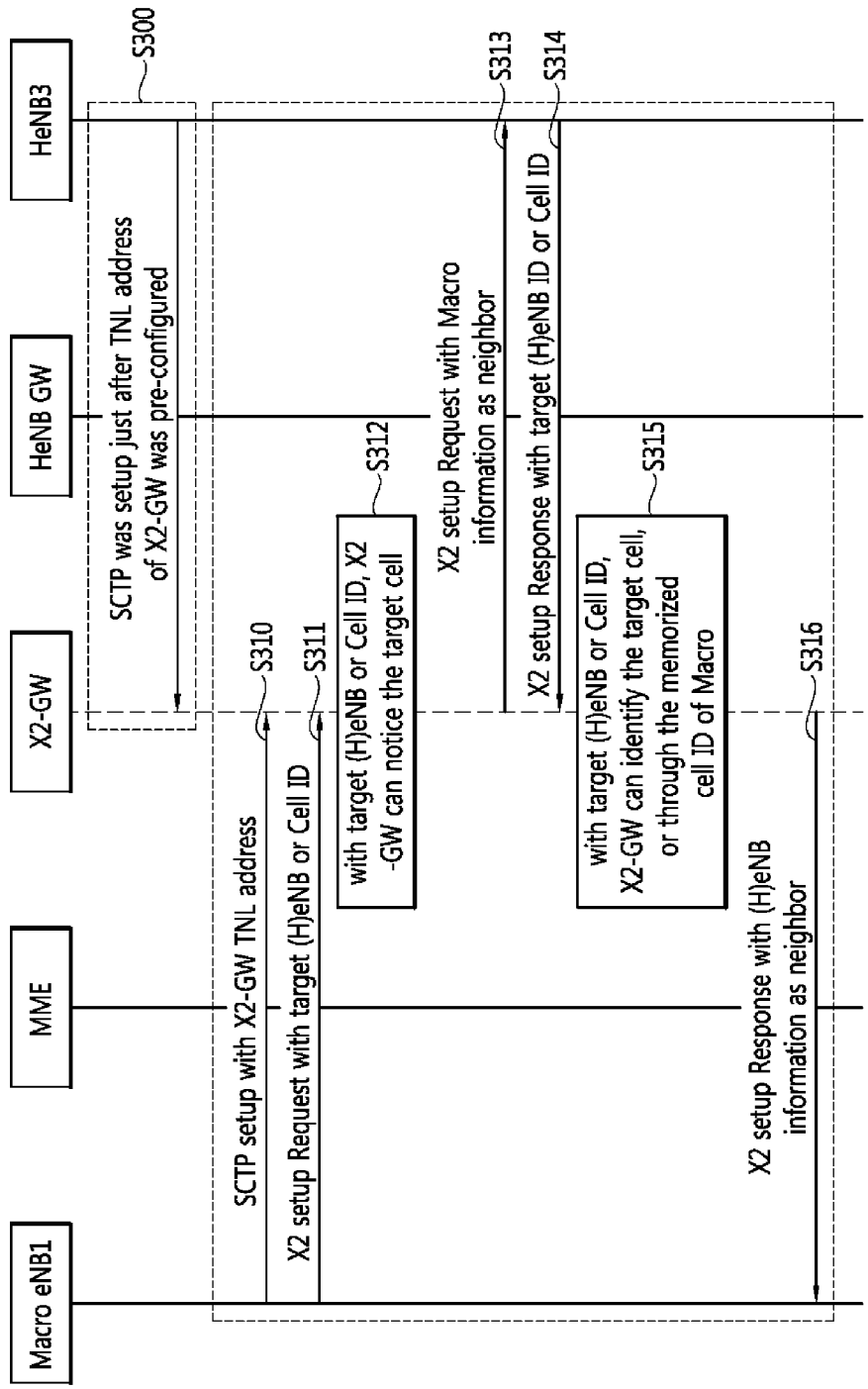
FIG. 11 shows another example of a SCTP connection and X2 interface setup procedure for a first scenario according to an embodiment of the present invention.

FIG. 11 shows another example of a SCTP connection and X2 interface setup procedure for a first scenario according to an embodiment of the present invention. In the example described in FIG. 11, it is assumed that the SCTP connection and X2 interface between the macro eNB1 and X2-GW has not been set up yet, and only the SCTP connection between the HeNB3 and X2-GW is completed. The SCTP connection and X2 interface setup procedure described in FIG. 11 may be performed after the macro eNB1 obtains the TNL address of the X2-GW, e.g., by the example described in FIG. 8, At step S300, SCTP connection is set up just after the TNL address of the X2-GW is pre-configured to the HeNB3.

At step S310, the macro eNB1 initiates SCTP connection setup using the obtained TNL address of the X2-GW. Also, at step S311, the macro eNB1 initiates X2 interface setup by transmitting an X2 setup request message. The X2 setup request message may include information on a target node, e.g., the target (H)eNB ID, target cell ID, or target RNL ID. The X2 setup request message described above in Table 1 may be used.

At step S312, upon receiving the information on the target node, the X2-GW may notice the target (H)eNB. Accordingly, at step S313, the X2-GW transmits an X2 setup request message with information on the macro eNB1 as neighbor information to the HeNB3. At step S314, the HeNB3 transmits an X2 setup response message with the target (H)eNB ID or target cell ID to the X2-GW. The X2 interface between the HeNB and X2-GW is set up.

At step S315, upon receiving the target (H)eNB ID or target cell ID from the HeNB3, the X2-GW may identify the target cell through the received the target (H)eNB ID or target cell ID or through memorized macro eNB1 cell ID. At step S316, the X2-GW transmits an X2 setup response message with information on the HeNB3 as neighbor information to the macro eNB1.

Figure 12:
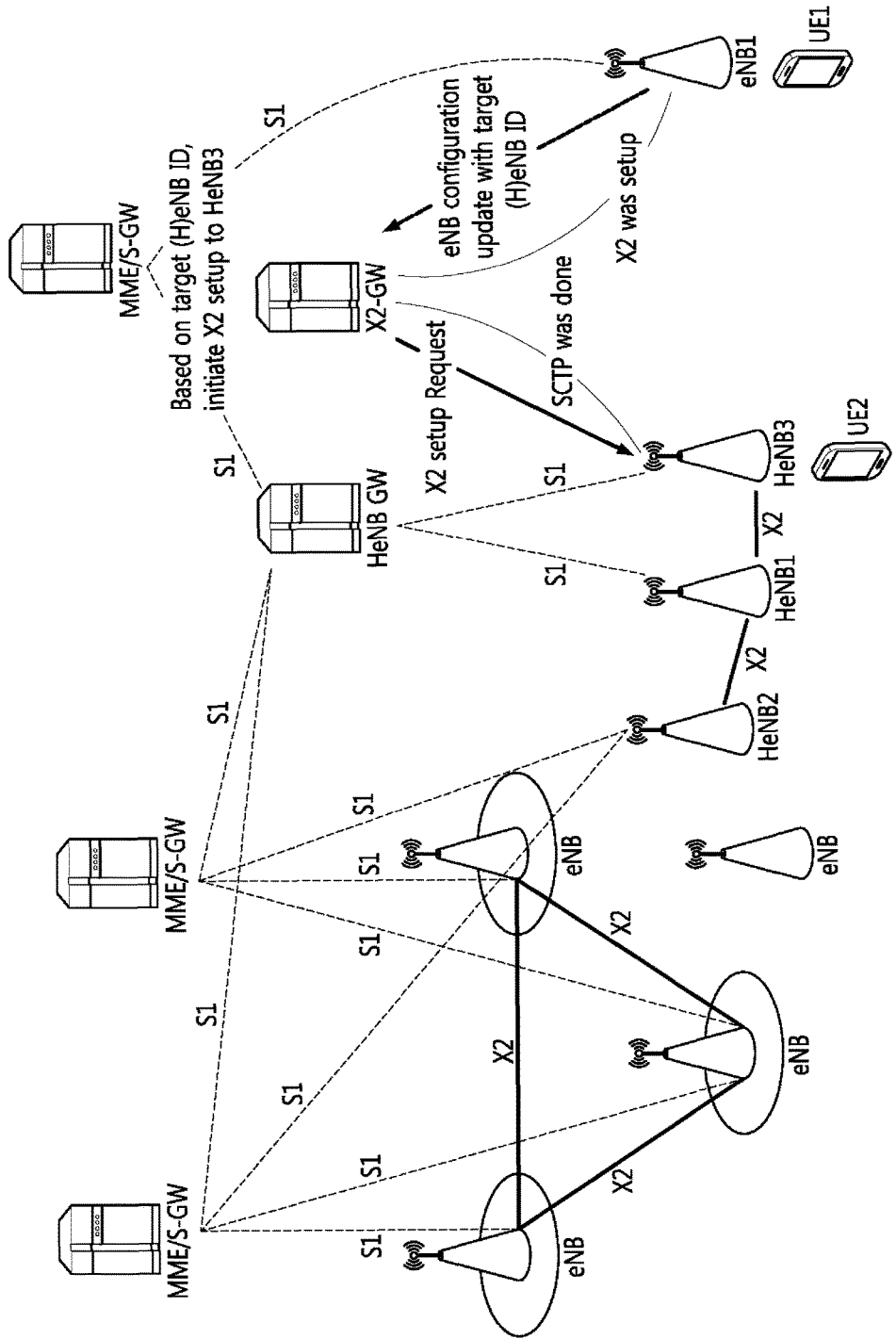
FIG. 12 shows another example of a method for setting up SCTP connection and X2 interface for a first scenario according to an embodiment of the present invention.

FIG. 12 shows another example of a method for setting up SCTP connection and X2 interface for a first scenario according to an embodiment of the present invention. In the example described in FIG. 12, it is assumed that the SCTP connection and X2 interface between the macro eNB1 and X2-GW has been set up.

Referring to FIG. 12, after the macro eNB1 obtains the TNL address of the X2-GW, e.g., by the example described in FIG. 8, since the X2 interface between the macro eNB1 and the X2-GW has been set up, the macro eNB1 transmits an eNB configuration update message with the target (H)eNB ID or target cell ID. Upon receiving the target (H)eNB ID or target cell ID, the X2-GW initiates X2 interface setup towards the HeNB3 based on the received target (H)eNB ID or target cell ID. The X2-GW transmits an X2 setup request message to the HeNB3, and the HeNB3 transmits an X2 setup response message to the X2-GW as a response to the X2 setup request message.

Figure 13:
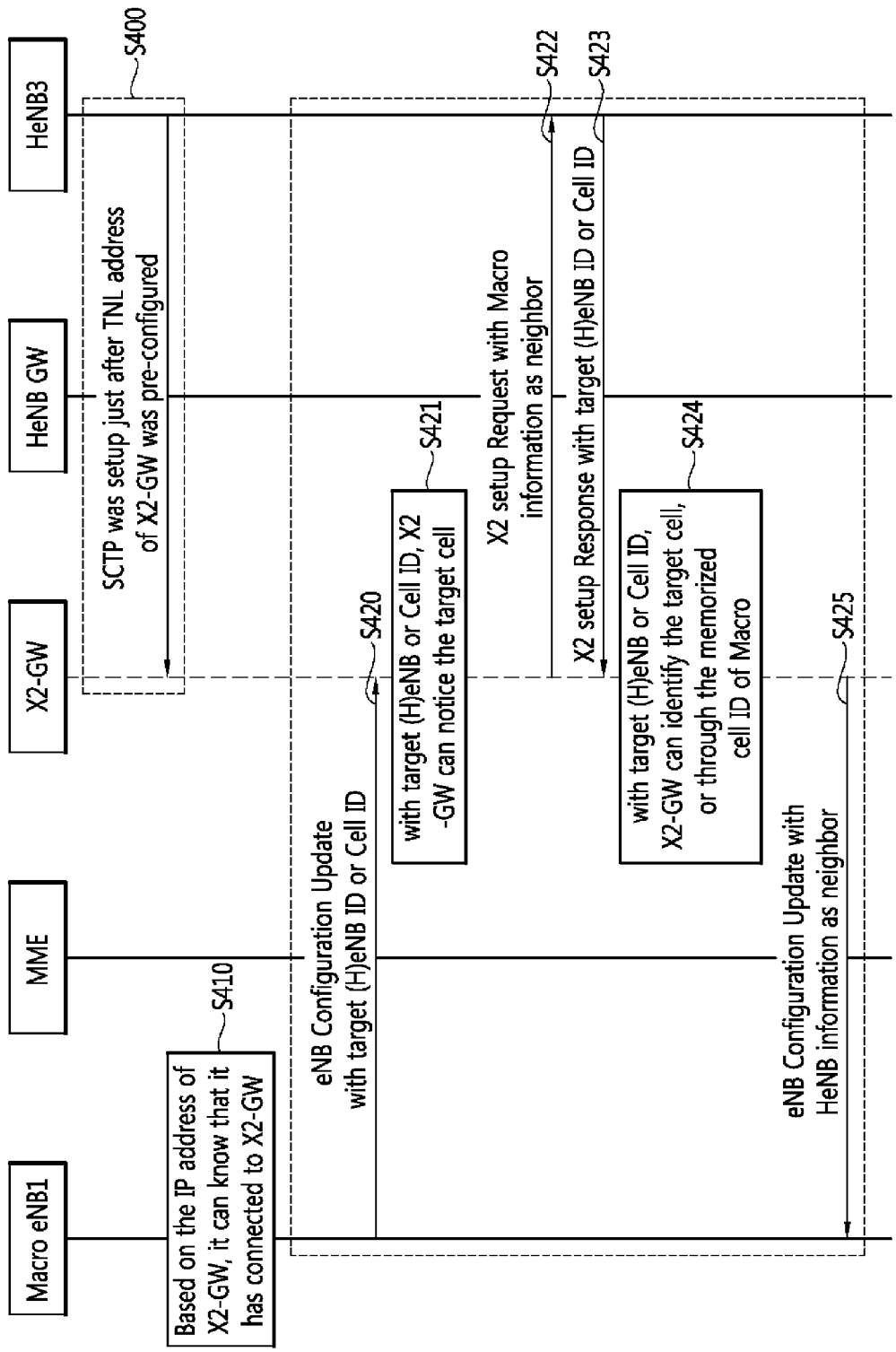
FIG. 13 shows another example of a SCTP connection and X2 interface setup procedure for a first scenario according to an embodiment of the present invention.

FIG. 13 shows another example of a SCTP connection and X2 interface setup procedure for a first scenario according to an embodiment of the present invention. In the example described in FIG. 13, it is assumed that the SCTP connection and X2 interface between the macro eNB1 and X2-GW has been set up, and only the SCTP connection between the HeNB3 and X2-GW is completed. The SCTP connection and X2 interface setup procedure described in FIG. 13 may be performed after the macro eNB1 obtains the TNL address of the X2-GW, e.g., by the example described in FIG. 8, At step S400, SCTP connection is set up just after the TNL address of the X2-GW is pre-configured to the HeNB3. At step S410, the macro eNB1 can know that the X2 interface between the macro eNB 1 and the X2-GW has been set up based on the obtained TNL address of the X2-GW.

At step S420, the macro eNB1 transmits an eNB configuration update message with information on a target node, e.g., the target (H)eNB ID, target cell ID, or target RNL ID.

Table 2 shows an example of the eNB configuration update message according to the embodiment of the present invention.

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 .. <maxCellineNB> | | Complete list of added cells served by the eNB | GLOBAL | reject |
| >Served Cell Information | M | | 9.2.8 | | — | — |
| >Neighbour Information | | 0 .. <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0..503, . . . ) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| Served Cells To Modify | | 0 .. <maxCellineNB> | | Complete list of modified cells served by the eNB | GLOBAL | reject |
| >Old ECGI | M | | ECGI 9.2.14 | This is the old E-UTRAN Cell Global Identifier | — | — |

TABLE 2-continued

| IE/Group Name | Presence | Range | IE type and reference | Semantics description | Criticality | Assigned Criticality |
|---|---|---|---|---|---|---|
| >Served Cell Information | M | | 9.2.8 | | — | — |
| >Neighbour Information | | 0 .. <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0..503, . . . ) | Physical Cell Identifier of the neighbour cell | — | — |
| >>EARFCN | M | | 9.2.26 | DL EARFCN for FDD and EARFCN for TDD | — | — |
| >>TAC | O | | OCTET STRING (2) | Tracking Area Code | YES | ignore |
| >Deactivation Indication | O | | ENUMERATED(deactivated, . . . ) | Indicates the concerned cell is switched off for energy saving reasons | YES | ignore |
| Served Cells To Delete | | 0 .. <maxCellineNB> | | Complete list of deleted cells served by the eNB | GLOBAL | reject |
| >Old ECGI | M | | ECGI 9.2.14 | This is the old E-UTRAN Cell Global Identifier of the cell to be deleted | — | — |
| GU Group Id To Add List | | 0 .. <maxPools> | | | GLOBAL | reject |
| >GU Group Id | M | | 9.2.20 | | — | — |
| GU Group Id To Delete List | | 0 .. <maxPools> | | | GLOBAL | reject |
| >GU Group Id Target cell information | M | | 9.2.20 | | — | — |

Referring to Table 2, the eNB configuration update message includes the target cell information as well as served cell information.

At step S421, upon receiving the information on the target node, the X2-GW may notice the target (H)eNB. Accordingly, at step S422, the X2-GW transmits an X2 setup request message with information on the macro eNB1 as neighbor information to the HeNB3. At step S423, the HeNB3 transmits an X2 setup response message with the target (H)eNB ID or target cell ID to the X2-GW. The X2 interface between the HeNB3 and X2-GW is set up.

At step S424, upon receiving the target (H)eNB ID or target cell ID from the HeNB3, the X2-GW may identify the target cell through the received the target (H)eNB ID or target cell ID or through memorized macro eNB1 cell ID. At step S425, the X2-GW transmits an eNB configuration update message with information on the HeNB3 as neighbor information to the macro eNB1.

Figure 14:
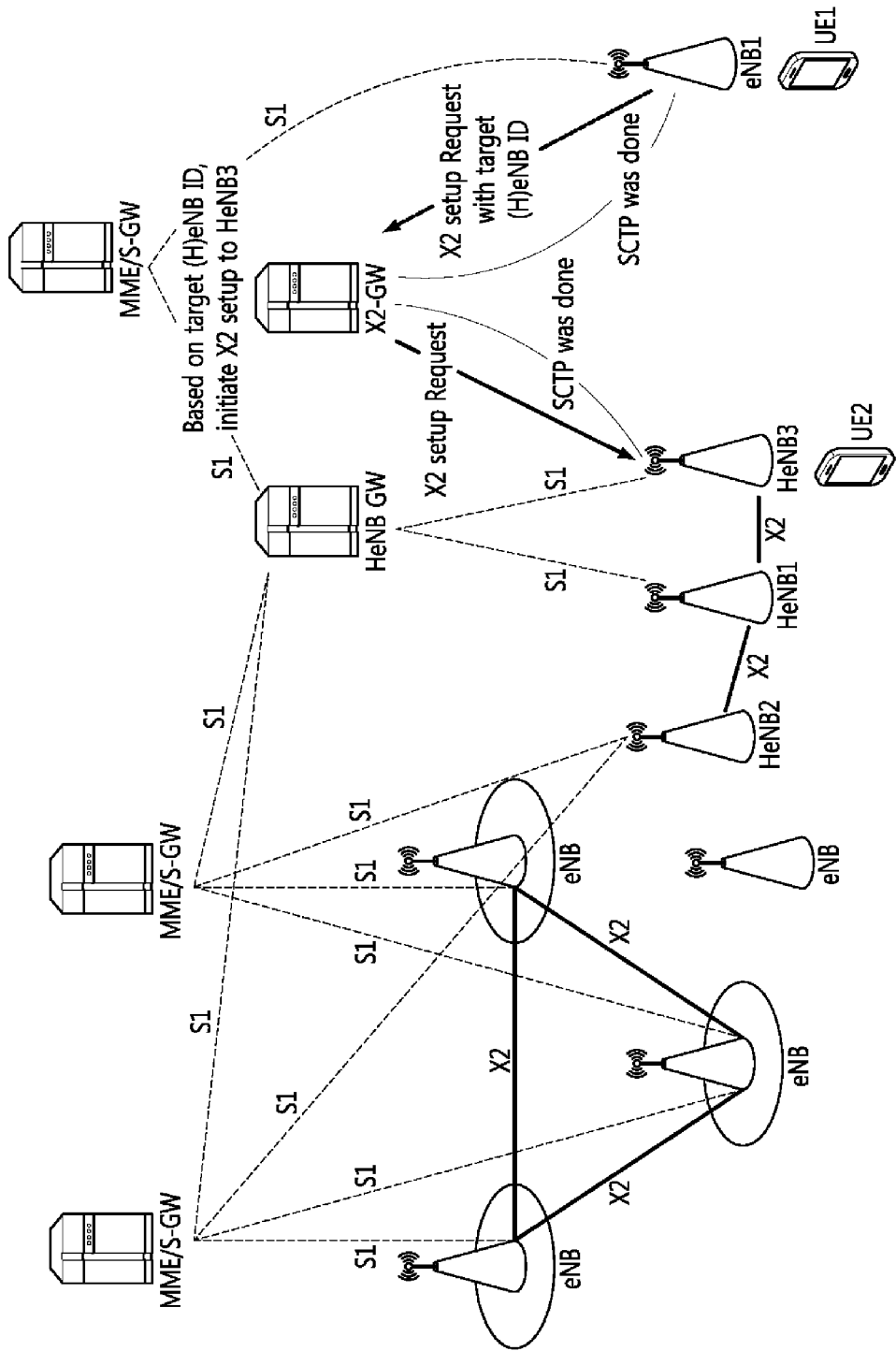
FIG. 14 shows another example of a method for setting up SCTP connection and X2 interface for a first scenario according to an embodiment of the present invention.

FIG. 14 shows another example of a method for setting up SCTP connection and X2 interface for a first scenario according to an embodiment of the present invention. In the example described in FIG. 14, it is assumed that only the SCTP connection between the macro eNB1 and X2-GW has been set up.

Figure 15:
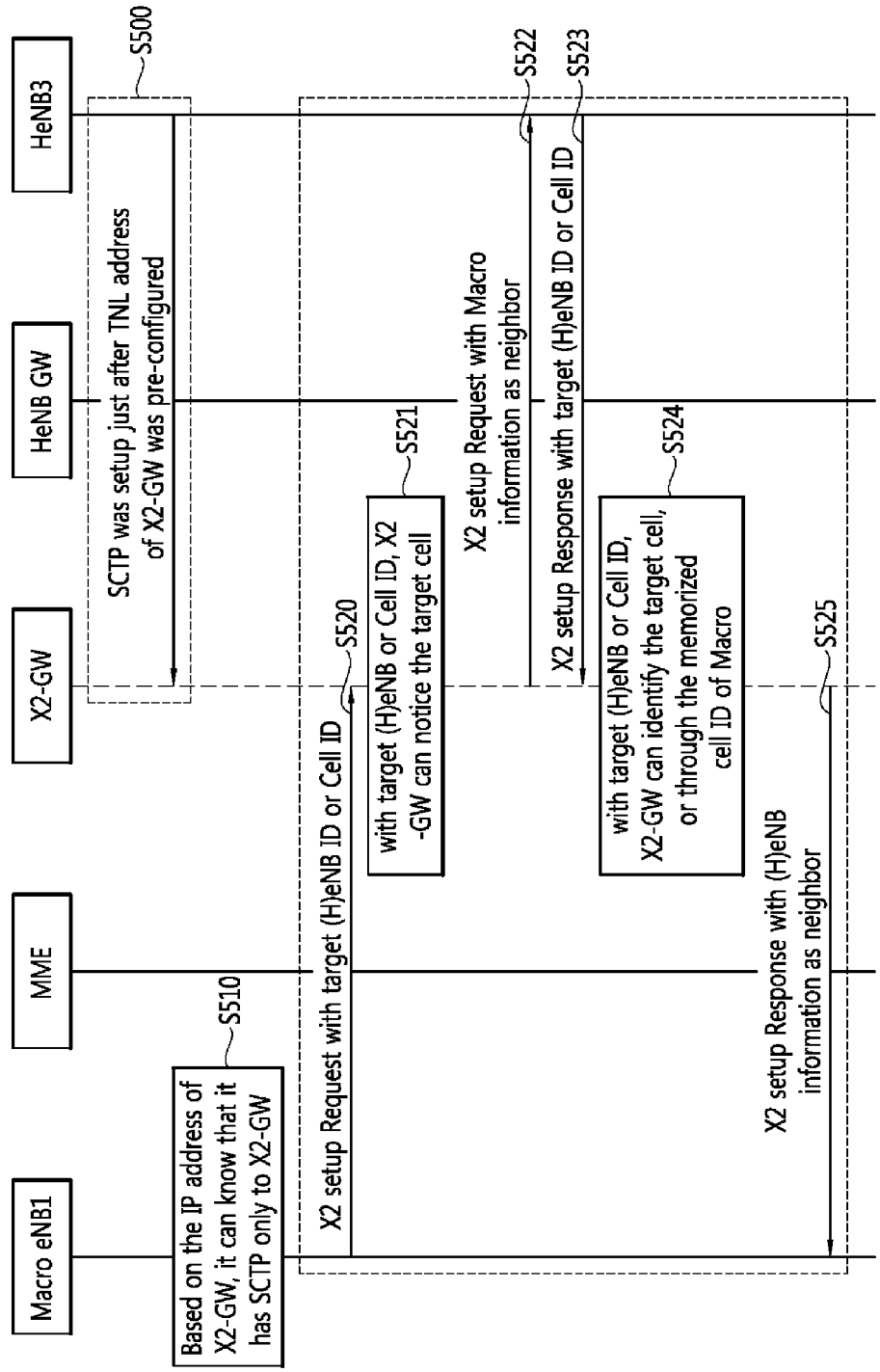
FIG. 15 shows another example of a SCTP connection and X2 interface setup procedure for a first scenario according to an embodiment of the present invention.

Referring to FIG. 14, after the macro eNB1 obtains the TNL address of the X2-GW, e.g., by the example described in FIG. 8, the macro eNB1 initiates X2 interface setup by transmitting an X2 setup request message. The X2 setup request message may include information on a target node, e.g., the target (H)eNB ID, target cell ID, or target RNL ID. Upon receiving the target (H)eNB ID or target cell ID, the X2-GW initiates X2 interface setup towards the HeNB3 based on the received target (H)eNB ID or target cell ID. The X2-GW transmits an X2 setup request message to the HeNB3, and the HeNB3 transmits an X2 setup response message to the X2-GW as a response to the X2 setup request message. The X2 setup response message may also include information on a target FIG. 15 shows another example of a SCTP connection and X2 interface setup procedure for a first scenario according to an embodiment of the present invention. In the example described in FIG. 15, it is assumed that only the SCTP connection between the macro eNB1 and X2-GW has been set up, and only the SCTP connection between the HeNB3 and X2-GW is completed. The SCTP connection and X2 interface setup procedure described in FIG. 15 may be performed after the macro eNB1 obtains the TNL address of the X2-GW, e.g., by the example described in FIG. 8, At step S500, SCTP connection is set up just after the TNL address of the X2-GW is pre-configured to the HeNB3. At step S510, the macro eNB1 can know that only the SCTP connection between the macro eNB1 and the X2-GW has been set up based on the obtained TNL address of the X2-GW.

At step S520, the macro eNB1 initiates X2 interface setup by transmitting an X2 setup request message. The X2 setup request message may include information on a target node, e.g., the target (H)eNB ID, target cell ID, or target RNL ID. The X2 setup request message described above in Table 1 may be used.

At step S521, upon receiving the information on the target node, the X2-GW may notice the target (H)eNB. Accordingly, at step S522, the X2-GW transmits an X2 setup request message with information on the macro eNB1 as neighbor information to the HeNB3. At step S523, the HeNB3 transmits an X2 setup response message with the target (H)eNB ID or target cell ID to the X2-GW. The X2 interface between the HeNB3 and X2-GW is set up.

At step S524, upon receiving the target (H)eNB ID or target cell ID from the HeNB3, the X2-GW may identify the target cell through the received the target (H)eNB ID or target cell ID or through memorized macro eNB1 cell ID. At step S525, the X2-GW transmits an X2 setup response message with information on the HeNB3 as neighbor information to the macro eNB1.

Figure 16:
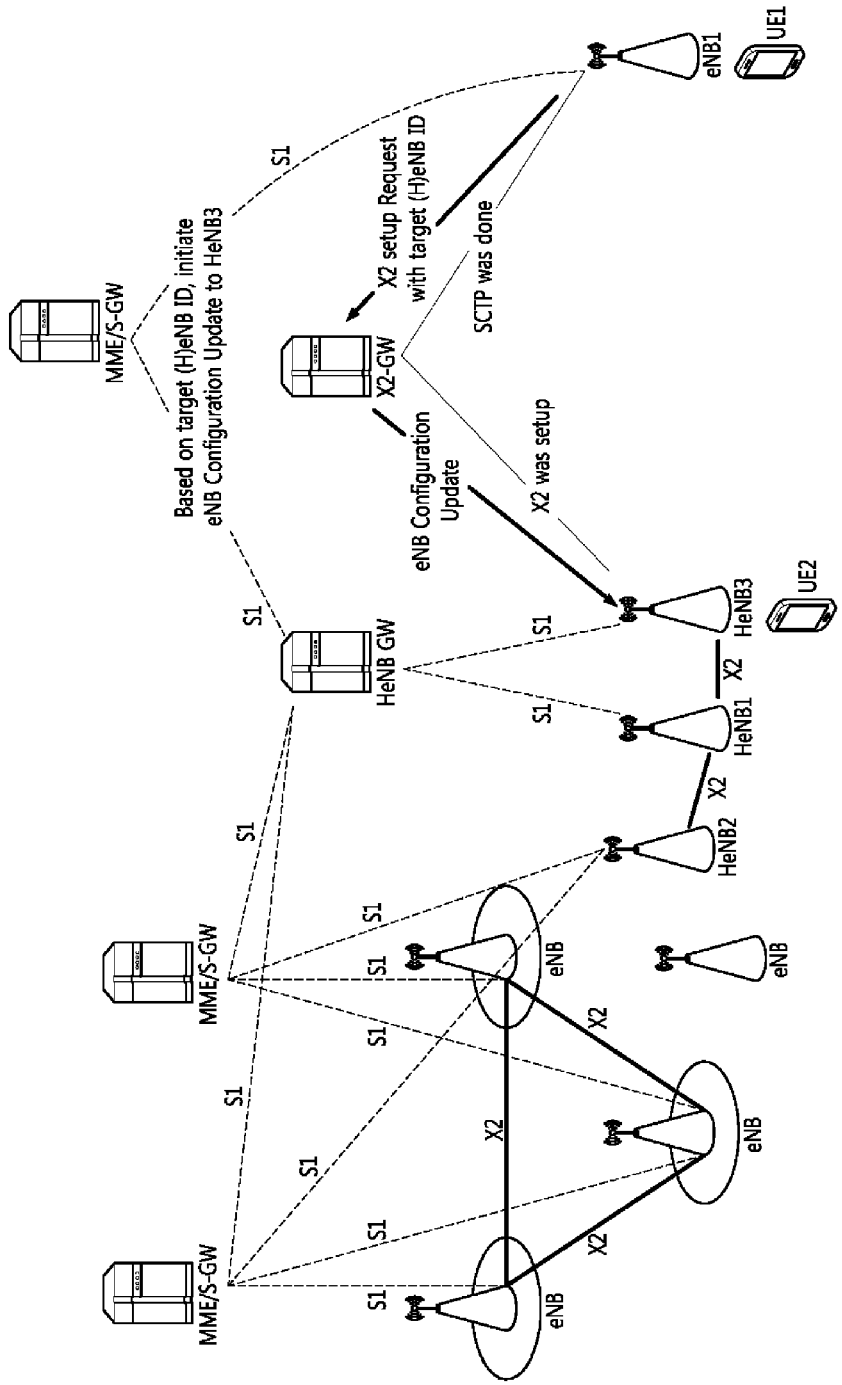
FIG. 16 shows another example of a method for setting up SCTP connection and X2 interface for a first scenario according to an embodiment of the present invention.

FIG. 16 shows another example of a method for setting up SCTP connection and X2 interface for a first scenario according to an embodiment of the present invention. In the example described in FIG. 16, it is assumed that only the SCTP connection between the macro eNB1 and X2-GW has been set up, and the SCTP connection and X2 interface between the HeNB3 and X2-GW has been set up.

Referring to FIG. 16, after the macro eNB1 obtains the TNL address of the X2-GW, e.g., by the example described in FIG. 8, the macro eNB1 initiates X2 interface setup by transmitting an X2 setup request message. The X2 setup request message may include information on a target node, e.g., the target (H)eNB ID, target cell ID, or target RNL ID. Upon receiving the target (H)eNB ID or target cell ID, the X2-GW initiates an eNB configuration update towards the HeNB3 based on the received target (H)eNB ID or target cell ID by transmitting an eNB configuration update message to the HeNB3.

It has been described that the X2 setup request message and/or eNB configuration update message includes the target cell information in the embodiments of the present invention described above. However, the present invention is not limited thereto. For example, when a UE performs handover, handover request message may include the target cell information.

Figure 17:
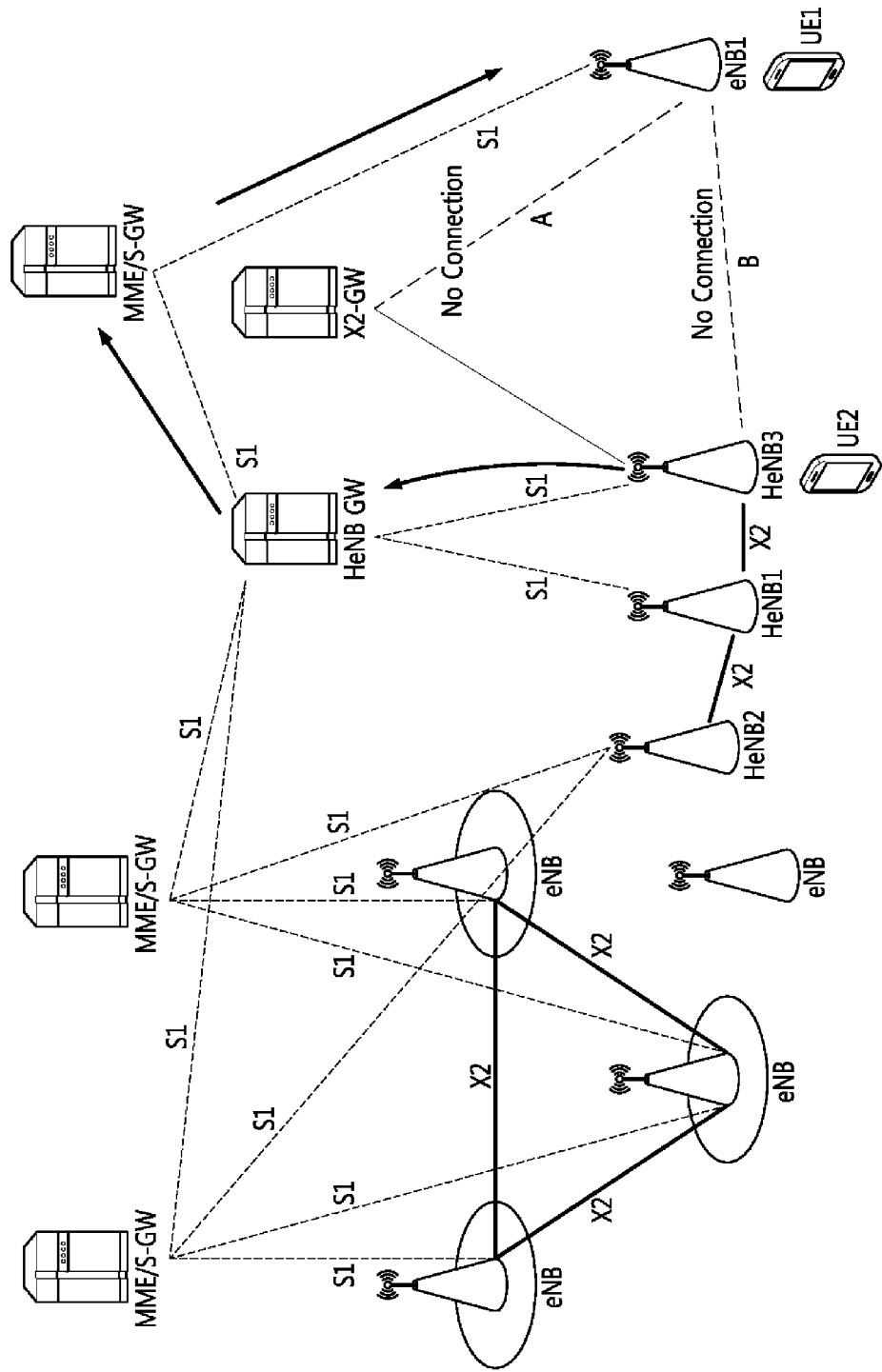
FIG. 17 shows a second scenario in which an embodiment of the present invention can be applied.

FIG. 17 shows a second scenario in which an embodiment of the present invention can be applied. In the second scenario, UE2 at a HeNB3 cell discovers the macro eNB1 and reports it to the HeNB3. The HeNB3 initiates the TNL address discovery procedure towards the macro eNB1. The macro eNB1 replies its TNL address or TNL address of the X2-GW to the HeNB3 by going through the MME and HeNB GW.

Figure 18:
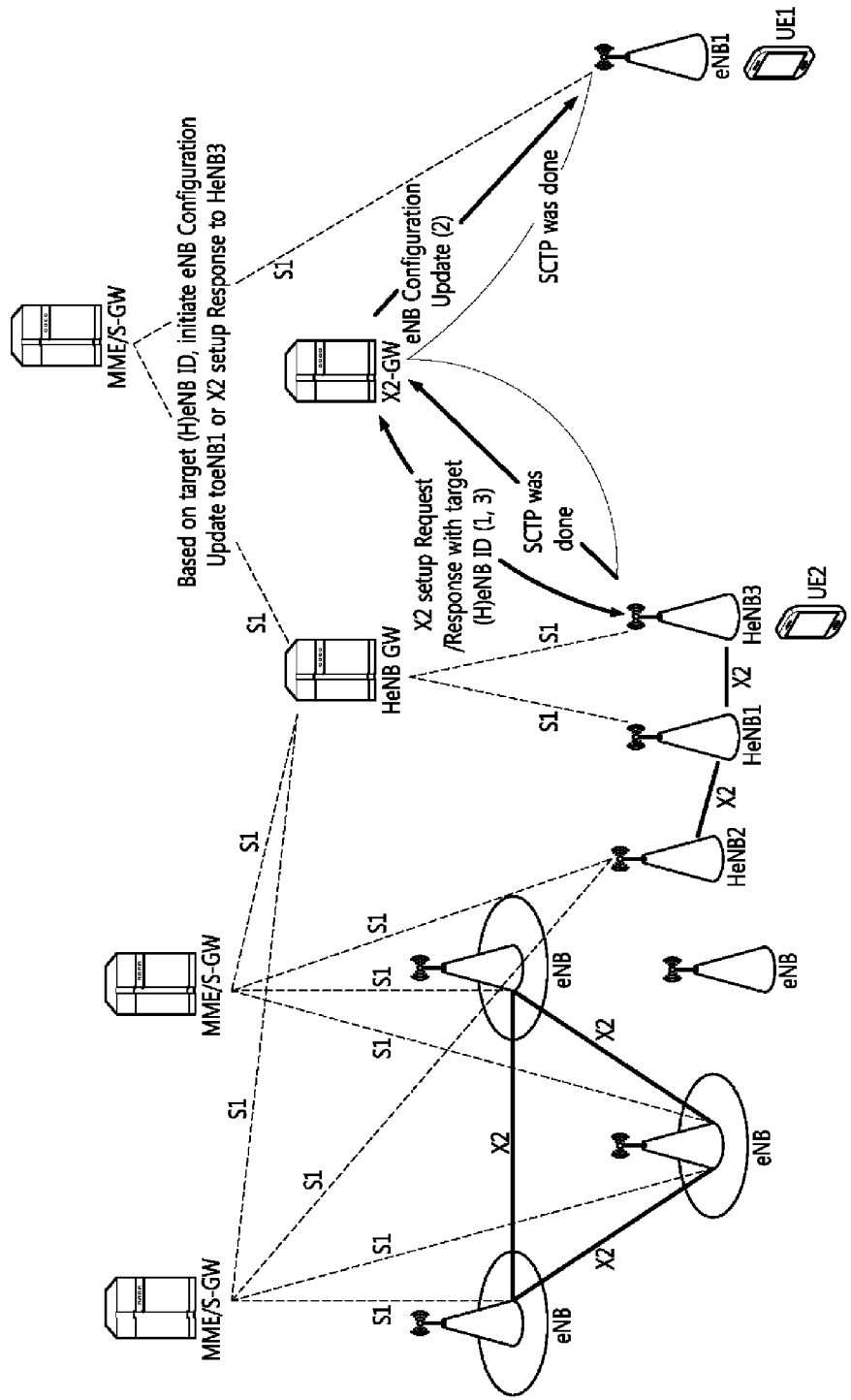
FIG. 18 shows an example of a method for setting up SCTP connection and X2 interface for a second scenario according to an embodiment of the present invention.

FIG. 18 shows an example of a method for setting up SCTP connection and X2 interface for a second scenario according to an embodiment of the present invention. In the example described in FIG. 18, it is assumed that the only SCTP connection between the HeNB3 and X2-GW has been set up, and the SCTP connection and X2 interface between the macro eNB1 and the X2-GW has been set up.

Referring to FIG. 18, after the HeNB3 obtains the TNL address of the X2-GW or the TNL address of the macro eNB1, e.g., by the example described in FIG. 17, the HeNB3 initiates X2 interface setup by transmitting an X2 setup request message. The X2 setup request message may include information on a target node, e.g., the target (H)eNB ID, target cell ID, or target RNL ID. The X2 setup request message described above in Table 1 may be used. Upon receiving the target (H)eNB ID or target cell ID, the X2-GW initiates eNB configuration update towards the macro eNB1 based on the received target (H)eNB ID or target cell ID by transmitting an eNB configuration update message to the macro eNB1. Also, the X2-GW transmits an X2 setup response message to the HeNB3 as a response to the X2 setup request message.

Figure 19:
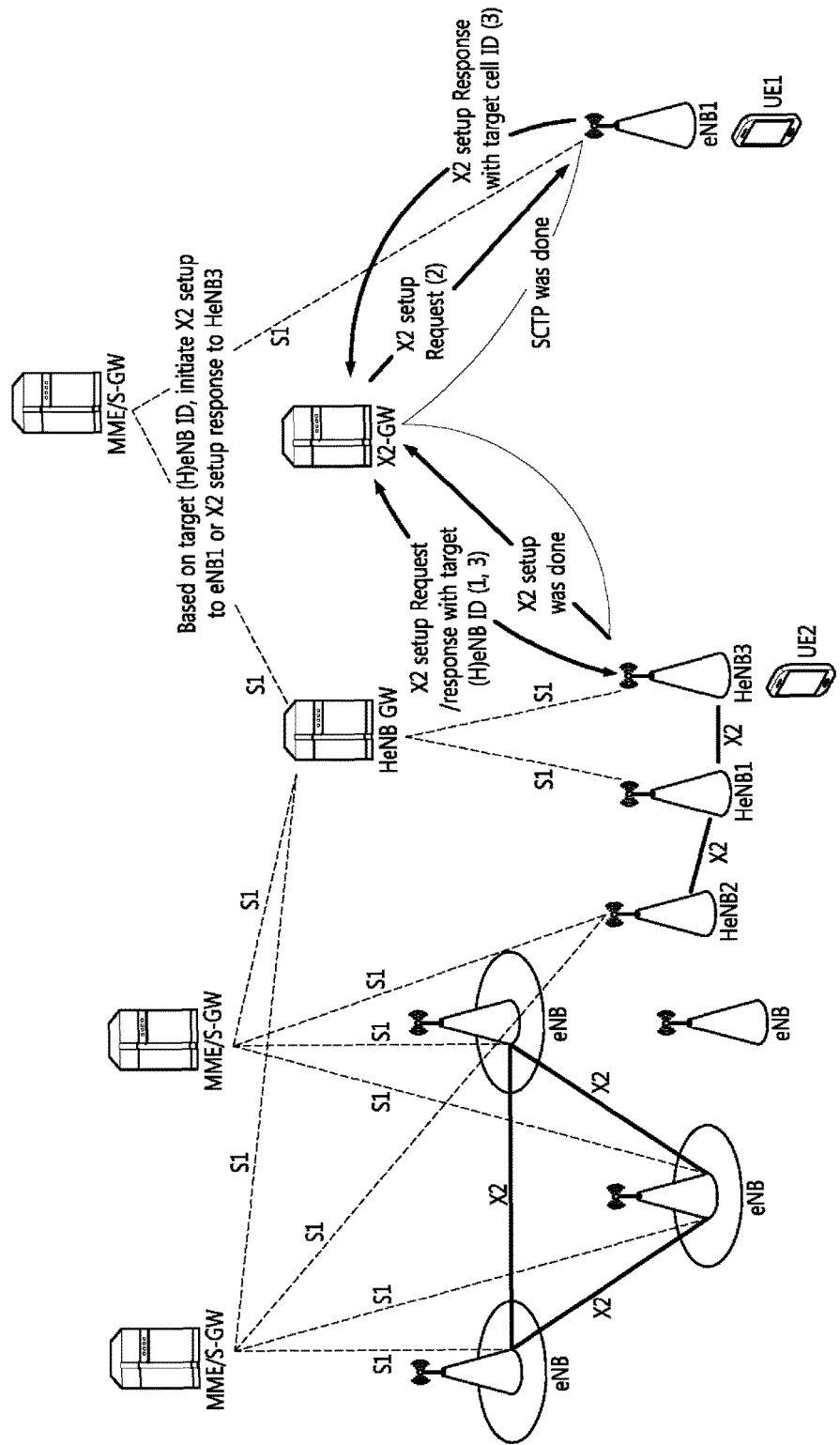
FIG. 19 shows another example of a method for setting up SCTP connection and X2 interface for a second scenario according to an embodiment of the present invention.

FIG. 19 shows another example of a method for setting up SCTP connection and X2 interface for a second scenario according to an embodiment of the present invention. In the example described in FIG. 19, it is assumed that the only SCTP connection between the HeNB3 and X2-GW has been set up, and only the SCTP connection between the macro eNB1 and the X2-GW has been set up.

Referring to FIG. 19, after the HeNB3 obtains the TNL address of the X2-GW or the TNL address of the macro eNB1, e.g., by the example described in FIG. 17, the HeNB3 initiates X2 interface setup by transmitting an X2 setup request message. The X2 setup request message may include information on a target node, e.g., the target (H)eNB ID, target cell ID, or target RNL ID. The X2 setup request message described above in Table 1 may be used. Upon receiving the target (H)eNB ID or target cell ID, the X2-GW initiates X2 interface setup towards the macro eNB1 based on the received target (H)eNB ID or target cell ID by transmitting an X2 setup request message to the macro eNB1. The macro eNB1 transmits an X2 setup response message with the target cell ID to the X2-GW as a response to the X2 setup request message. Also, the X2-GW transmits an X2 setup response message to the HeNB3 as a response to the X2 setup request message.

Figure 20:
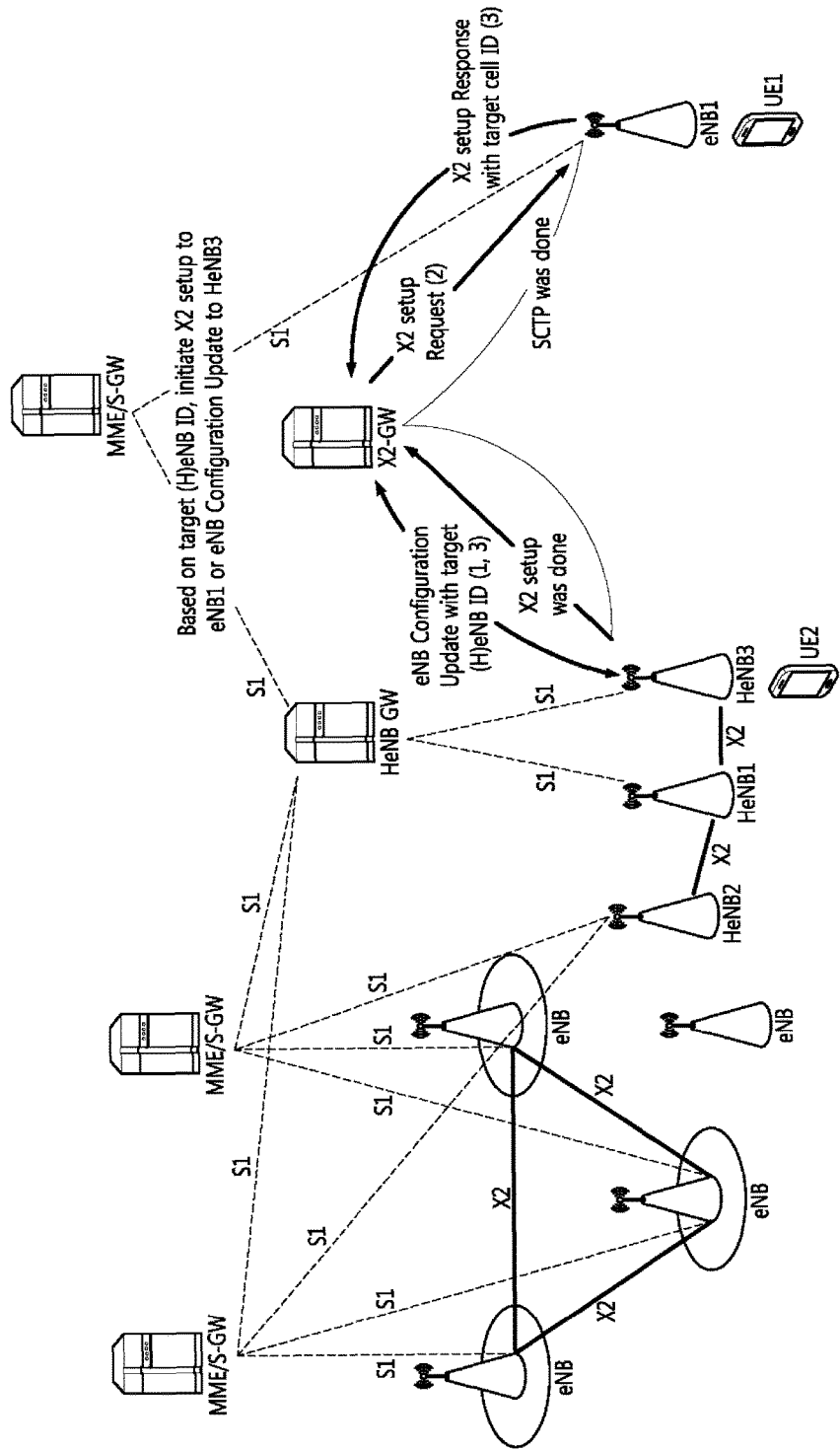
FIG. 20 shows another example of a method for setting up SCTP connection and X2 interface for a second scenario according to an embodiment of the present invention.

FIG. 20 shows another example of a method for setting up SCTP connection and X2 interface for a second scenario according to an embodiment of the present invention. In the example described in FIG. 20, it is assumed that the SCTP connection and X2 interface between the HeNB3 and X2-GW has been set up, and only the SCTP connection between the macro eNB1 and the X2-GW has been set up.

Referring to FIG. 20, after the HeNB3 obtains the TNL address of the X2-GW or the TNL address of the macro eNB1, e.g., by the example described in FIG. 17, the HeNB3 initiates eNB configuration update by transmitting an eNB configuration update message. The eNB configuration update message may include information on a target node, e.g., the target (H)eNB ID, target cell ID, or target RNL ID. The eNB configuration update message described above in Table 2 may be used. Upon receiving the target (H)eNB ID or target cell ID, the X2-GW initiates X2 interface setup towards the macro eNB1 based on the received target (H)eNB ID or target cell ID by transmitting an X2 setup request message to the macro eNB1. The macro eNB1 transmits an X2 setup response message with the target cell ID to the X2-GW as a response to the X2 setup request message. Also, the X2-GW transmits an eNB configuration update message to the HeNB3.

Figure 21:
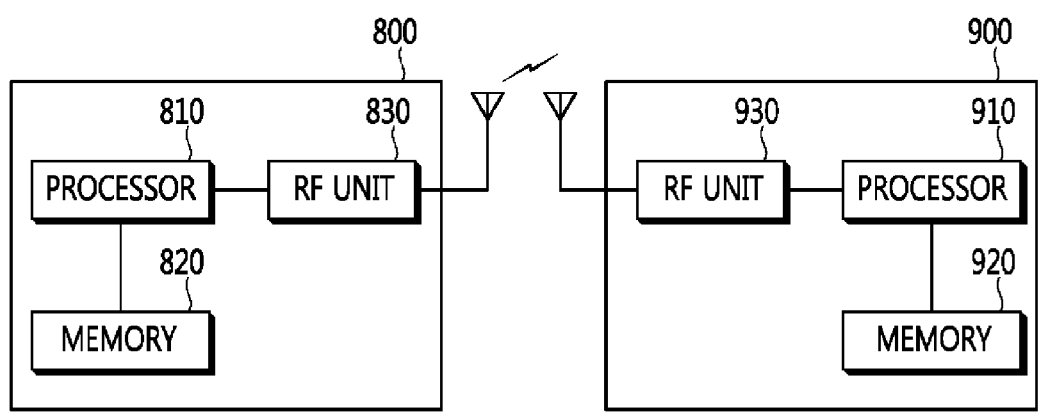
FIG. 21 is a block diagram showing wireless communication system to implement an embodiment of the present invention.

FIG. 21 is a block diagram showing wireless communication system to implement an embodiment of the present invention.

An eNB or HeNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An X2-GW 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for processing, by a gateway, an X2 message in a wireless communication system, the method comprising:
   receiving, by the gateway, an X2 setup request message and first target information from a first eNodeB (eNB);
   transmitting, by the gateway, the received X2 setup request message to a second eNB based on the received first target information;
   receiving, by the gateway, an X2 setup response message and second target information from the second eNB; and
   transmitting, by the gateway, the received X2 setup response message to the first eNB based on the received second target information.

2. The method of claim 1, wherein the first target information is additional information of the X2 setup request message.

3. The method of claim 1, wherein the first target information is not included in the X2 setup request message.

4. The method of claim 1, wherein the second target information is additional information of the X2 setup response message.

5. The method of claim 1, wherein the second target information is not included in the X2 setup response message.

6. The method of claim 1, wherein the first target information includes a target eNB identifier.

7. The method of claim 1, wherein the first target information includes a target radio network layer identifier (RNL ID).

8. The method of claim 1, wherein the second target information includes a target eNB identifier.

9. The method of claim 1, wherein the second target information includes a target RNL ID.

10. The method of claim 1, wherein at least one of the first eNB or the second eNB is a home eNB (HeNB), and
    wherein the gateway is an X2 gateway which has no connection with a mobility management entity (MME).

11. A gateway in a wireless communication system, the gateway comprising:
    a memory; and
    a processor, coupled to the memory, that:
      receives an X2 setup request message and first target information from a first eNodeB (eNB);
      transmits the received X2 setup request message to a second eNB based on the received first target information;
      receives an X2 setup response message and second target information from the second eNB; and
      transmits the received X2 setup response message to the first eNB based on the received second target information.

12. The gateway of claim 11, wherein the first target information is additional information of the X2 setup request message.

13. The gateway of claim 11, wherein the first target information is not included in the X2 setup request message.

14. The gateway of claim 11, wherein the second target information is additional information of the X2 setup response message.

15. The gateway of claim 11, wherein the second target information is not included in the X2 setup response message.

16. The gateway of claim 11, wherein the first target information includes a target eNB identifier.

17. The gateway of claim 11, wherein the first target information includes a target radio network layer identifier (RNL ID).

18. The gateway of claim 11, wherein the second target information includes a target eNB identifier.

19. The gateway of claim 11, wherein the second target information includes target RNL ID.

20. The gateway of claim 11, wherein at least one of the first eNB or the second eNB is a home eNB (HeNB), and
    wherein the gateway is an X2 gateway which has no connection with a mobility management entity (MME).

* * * * *